(12) United States Patent
Onitsuka et al.

(10) Patent No.: US 11,426,653 B2
(45) Date of Patent: Aug. 30, 2022

(54) DECORATIVE ILLUMINATION DEVICE, CONTROL DEVICE FOR DECORATIVE ILLUMINATION DEVICE, AND GAME MACHINE

(71) Applicant: OMRON Corporation, Kyoto (JP)

(72) Inventors: Hiroyuki Onitsuka, Kani (JP); Junya Fujita, Ichinomiya (JP); Takehiro Agata, Ichinomiya (JP)

(73) Assignee: OMRON CORPORATION, Kyoto (JP)

( * ) Notice: Subject to any disclaimer, the term of this patent is extended or adjusted under 35 U.S.C. 154(b) by 85 days.

(21) Appl. No.: 17/174,758

(22) Filed: Feb. 12, 2021

(65) Prior Publication Data

US 2021/0275910 A1 Sep. 9, 2021

(30) Foreign Application Priority Data

Mar. 4, 2020 (JP) .............................. JP2020-037092

(51) Int. Cl.
| | |
|---|---|
| *A63F 13/28* | (2014.01) |
| *G07F 17/32* | (2006.01) |
| *A63F 9/24* | (2006.01) |
| *F21V 8/00* | (2006.01) |
| *F21V 33/00* | (2006.01) |

(52) U.S. Cl.
CPC ................ *A63F 13/28* (2014.09); *A63F 9/24* (2013.01); *F21V 33/008* (2013.01); *G02B 6/0076* (2013.01); *G07F 17/3204* (2013.01); *A63F 2009/2451* (2013.01); *F21V 2200/20* (2015.01)

(58) Field of Classification Search
CPC ...... A63F 9/24; A63F 2009/2451–2454; A63F 13/28; A63F 13/90; F21V 33/008; F21V 2200/20; G02B 6/0021; G02B 6/0036; G02B 6/0076; G02B 6/0091; G07F 17/3204–3213
See application file for complete search history.

(56) References Cited

U.S. PATENT DOCUMENTS 10,809,440 B2 * 10/2020 Takagi ................ G02B 6/0031

FOREIGN PATENT DOCUMENTS

JP 2006-181279 A 7/2006

\* cited by examiner

*Primary Examiner* — Jason M Han
(74) *Attorney, Agent, or Firm* — Metrolex IP Law Group, PLLC

(57) ABSTRACT

A long decorative illumination device which is long in the vertical direction and for being installed in the sides of a game machine may be provided with a plurality of light guide plates that can be individually illuminated. The plurality of light guide plates may be arranged in the vertical direction with gaps therebetween and in a slanted state so that the light emitting surfaces thereof are oriented toward a window part which is open from at least two directions of the front surface and the side surfaces of the decorative illumination device. A controller may control the light emission of the plurality of light guide plates to perform visual effect lighting having an impactful visual effect, while controlling the light emission from the plurality of light guide plates to convey predetermined information.

20 Claims, 19 Drawing Sheets

Player Viewpoint (Front)　　　(Side)　　　(Rear Diagonal)　　　(Rear)

DECORATIVE ILLUMINATION DEVICE, CONTROL DEVICE FOR DECORATIVE ILLUMINATION DEVICE, AND GAME MACHINE

CROSS REFERENCE TO RELATED APPLICATIONS

This application claims priority to prior Japanese Patent Application No. 2020-037092 filed with the Japan Patent Office on Mar. 4, 2020, the entire contents of which are incorporated herein by reference.

FIELD

The disclosure relates to a decorative illumination device that can be installed in a game machine, a control device for a decorative illumination device, and a game machine.

BACKGROUND

Game machines may be equipped with a decorative illumination device for causing LEDs and the like to emit light in order to draw a player's interest to the game. Furthermore, in some game machines, the upper part of the enclosure may be equipped with a tower light for conveying information pertaining to the game machine to the player, manager, or facility employee, for example (described in, for example, Japanese Patent Publication No. 2006-181279).

Information pertaining to the game machine may be, for instance: information indicating the operation state of the game machine (i.e., whether the machine is operating or not operating); information indicating the open or closed state of the door to the game board, or the like; information indicating that the game machine is in management mode; or information indicating that the game machine is experiencing a general error, or the like. A game machine is also usually provided with a cheat detection unit for detecting whether cheating is occurring with respect to the game machine. The game machine is configured to notify the amusement center manager or employee of the occurrence of cheating when the cheat detection unit detects cheating. The tower light is also employed to convey that such cheating has occurred.

Traditionally, a tower light and a decorative illumination device for providing a visual effect have different functions and are established separately.

SUMMARY

However, given that the above-mentioned kind of existing technologies establish the tower light and a decorative illumination device for providing a visual effect separately, one problem is that the cost increases. The tower light is also limited in the amount of information that can be conveyed thereby.

A decorative illumination device, a control device for a decorative illumination device, and a game machine according to one or more embodiments are provided, which may be capable of providing a highly impactful visual effect, and conveying more information while minimizing increases in cost.

A decorative illumination device according to one or more embodiments may be elongated and configured for installation in an enclosure of a game machine and may include: a plurality of light guide plates configured to reflect light entering therein from an end surface thereof with reflection surfaces formed in recesses thereon, and causing the light to be emitted from a light emitting surface thereof; a plurality of light sources provided corresponding to said plurality of light guide plates; a long window part open from at least two directions of the front surface of said decorative illumination device and side surfaces connected to said front surface; and a controller; the plurality of light guide plates is slanted with gaps therebetween, so that in the slanted state the light emitting surfaces thereof are oriented toward the window part; and the controller including a visual effects function unit configured to control the light emission of the plurality of light guide plates by controlling the driving of the plurality of light sources to control light emission from the plurality of light guide plates to perform visual effect lighting and a notification function unit configured to control light emission from the plurality of light guide plates to convey predetermined information.

A control device for a decorative illumination device according to one or more embodiments may be a control device for a decorative illumination device that is elongated and configured for installation in an enclosure of a game machine and may include: a plurality of light guide plates configured to reflect light entering therein from an end surface thereof with reflection surfaces formed in recesses thereon, and causing the light to be emitted from a light emitting surface thereof; a plurality of light sources provided corresponding to said plurality of light guide plates; a long window part open from at least two directions of the front surface of said decorative illumination device and side surfaces connected to said front surface; the plurality of light guide plates is slanted with gaps therebetween, so that in the slanted state the light emitting surfaces thereof are oriented toward the window part; and the control device including a visual effects function unit configured to control the light emission of the plurality of light guide plates by controlling the driving of the plurality of light sources to control light emission from the plurality of light guide plates to perform visual effect lighting and a notification function unit configured to control light emission from the plurality of light guide plates to convey predetermined information.

The plurality of light guide plates may be slanted with gaps therebetween, and the above configuration allows for the light emitting surfaces of the plurality of light guide plates to be oriented toward the window part while slanted. Arranging the plurality of light guide plates in the above described manner may allow for a three dimensional visual effect lighting that provides a sense of depth. Moreover, the illumination of not only the light emitting surface of the light guide plate but also the illumination of the outer edges of the light guide plate may be presented; therefore, the shape of the light guide plate can be incorporated into the visual effect.

The window part may be opened from at least two directions of the front surface and the side surfaces, whereby such a plurality of light guide plates whose light emitting surface and outer edges can be seen, is visible from the at least the two open directions. Hereby, it may be possible to also present visual effect lighting with a highly impactful visual for a user who is not directly in front of the device.

Additionally, the controller or control device in the above configurations may include a visual effects function unit and a notification function unit, the visual effects function unit controls the light emission from the plurality of light guide plates to perform visual effect lighting, and the notification function unit controls the light emission from the plurality of light guide plates to convey predetermined information. That is, the above configuration not only uses a plurality of light guide plates to provide visual effect lighting, but also may use the respective light emissions to convey information making use of the fact that the light emissions can be seen from at least two directions along the front and sides. Hereby, the decorative illumination device according to one or more embodiments may be provided with two functions, a visual effects function and a notification function which may allow for providing a highly impactful visual effect and conveying more information while minimizing increases in cost.

In the control device for the decorative illumination device according to one or more embodiments herein, the decorative illumination device may be elongated and long in the vertical direction, the plurality of light guide plates may be arranged in the vertical direction in a slanted state where the rear part is higher than the front part so that the light emitting surfaces thereof may be oriented toward the window part.

In the control device for the decorative illumination device according to one or more embodiments herein, the notification function unit may control the light emission from a predetermined plurality of light guide plates located at the top part of the decorative illumination device to convey predetermined information.

The above configuration may tend to make it difficult for a light guide plate used for conveying information to be in a blind spot by controlling the light emission from a predetermined plurality of light guide plates located at the top part of the device thus making confirmation possible even from a location away from the game machine and securing visibility comparable to that of conventional tower light.

Accordingly, the predetermined information may be information indicating the operation state of the game machine, information indicating the open or closed state of a door to the game machine, information indicating the game machine may be experiencing an error, or information for conveying that there is cheating with respect to the game machine.

In the control device for the decorative illumination device according to one or more embodiments herein, the notification function unit may convey information related to a numerical value with several of the light guide plates the notification function unit causes to emit light. The above configuration thereby may allow for using the number of light guide plates illuminated to convey information related to a numerical value.

Accordingly, a pair of the decorative illumination devices may be installed with one on each side of the front of the enclosure of the game machine; and the notification function unit may convey information related to numerical values that are mutually related with the number of light guide plates in the respective decorative illumination devices on the left and right caused to emit light.

Moreover, the information related to numerical values that are mutually related may be information indicating an amount credited in the game machine and an amount paid out from the game machine, information indicating the number of jackpots and small prizes, or information indicating the number of successes and the time of success.

In the control device for the decorative illumination device according to one or more embodiments herein, when the notification function unit may be conveying information, among the plurality of light guide plates, the visual effects function unit uses the light guide plates not being used by the notification function unit to convey information to perform the visual effect lighting.

The above configuration may allow for continuing the visual effects without interruption even while the notification function unit is conveying information, and is capable of effectively minimizing degradation in the impact of the visual effect due to conveying the information.

In the control device for the decorative illumination device according to one or more embodiments, the notification function unit may convey predetermined information by interrupting the visual effect lighting from the visual effects function unit.

The information conveyed by the notification function unit using the light guide plates may interrupt the visual effect lighting; therefore, the above described configuration may be capable of effectively minimizing degradation in the impact of the visual effect.

A control device for a decorative illumination device according to various embodiments may be implemented by a computer. Accordingly, a control program for a control device may be configured to cause a computer to function as the control device to perform operations as each of the above components, and a computer readable medium whereupon the control program is stored are within the scope of the invention.

To address the forgoing, a game machine according to one or more embodiments may include a main game unit and a decorative illumination device according to an aspect herein installed on the enclosure of the main game unit.

A decorative illumination device, a control device for a decorative illumination device, and a game machine according to one or more embodiments may be capable of providing a highly impactful visual effect, and conveying more information while minimizing increases in cost.

DETAILED DESCRIPTION

One or more embodiments are described below on the basis of the drawings. One or more embodiments provide an example of a long decorative illumination device that may be assembled onto the enclosure of a game machine, where the decorative illumination device is vertically long.

1. Example Application

Figure 1:
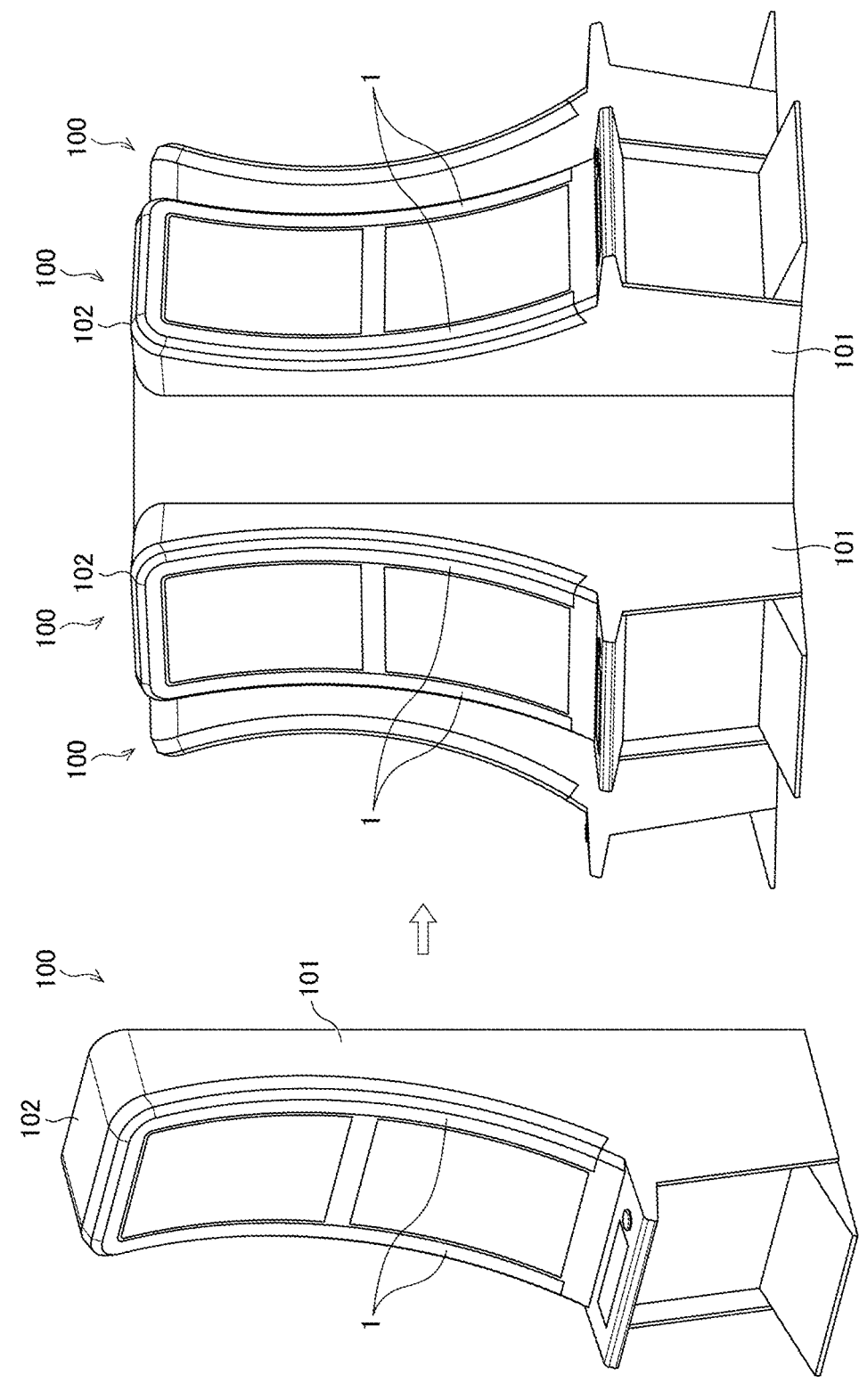
FIG. 1 is a perspective diagram illustrating an example of a game machine in which a decorative illumination device of a first embodiment is mounted.
Figure 2:
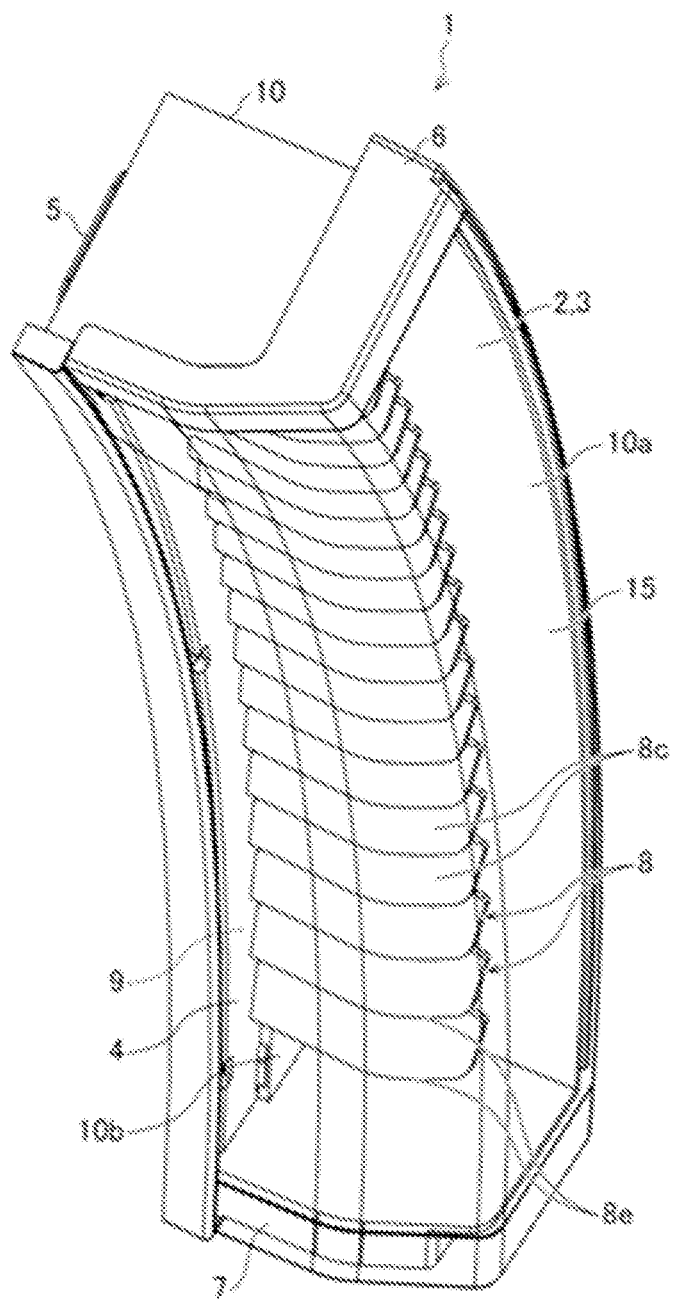
FIG. 2 is a perspective diagram illustrating a decorative illumination device when viewed from above while all light guide plates are illuminated.
Figure 2:
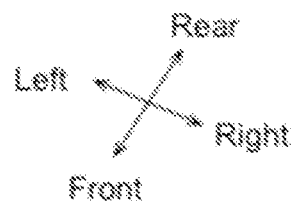
Figure 3:
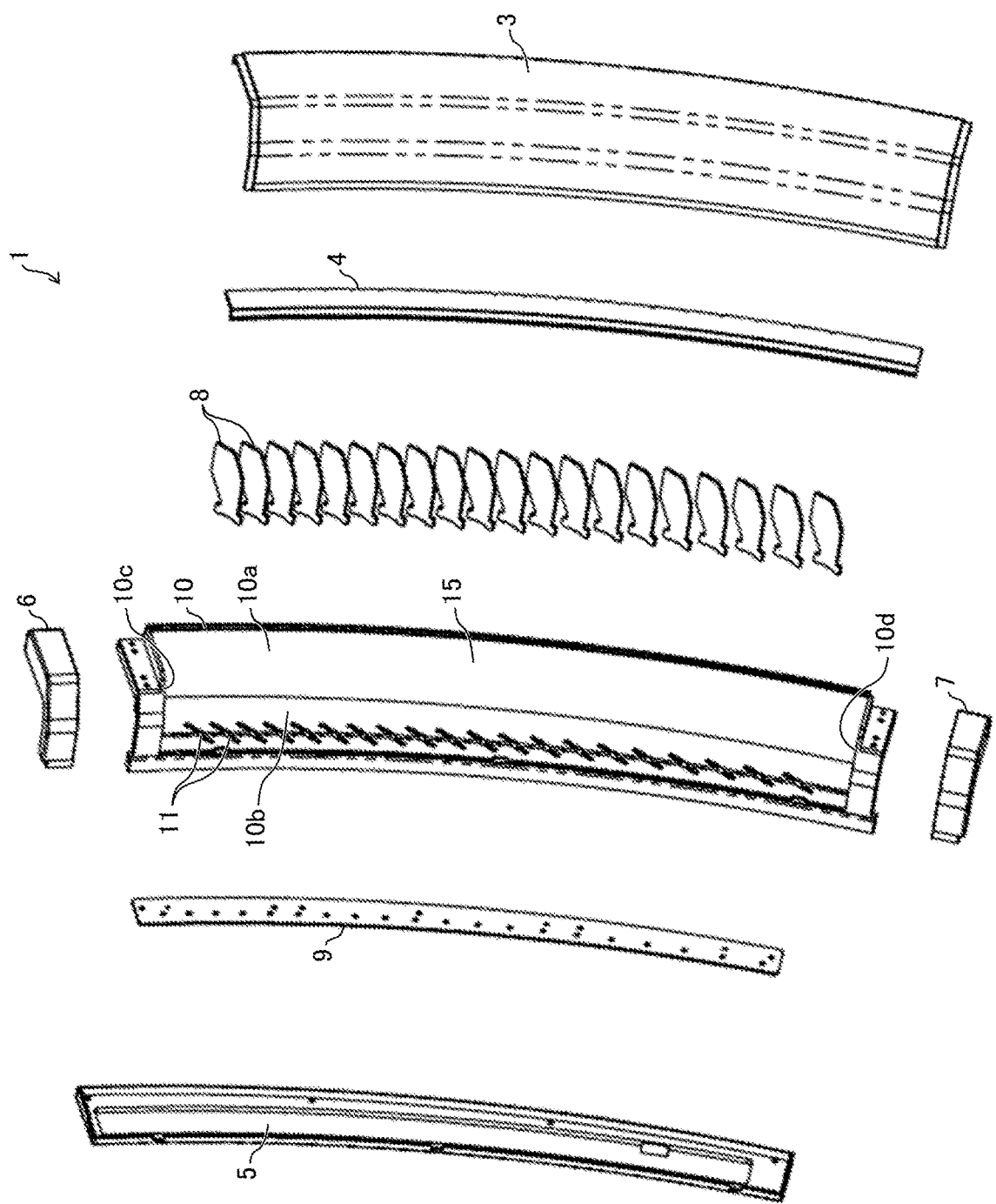
FIG. 3 is an exploded perspective diagram illustrating a configuration of a decorative illumination device.

As illustrated in FIG. 1, a decorative illumination device 1, which is vertically long, can be installed on the left and front right edges of the front surface of the enclosure 101 of a main game unit 102 in a game machine 100, such as a slot machine. As illustrated in FIG. 2 and FIG. 3, the decorative illumination device 1 is an elongated shape and is long in the vertical direction. The decorative illumination device 1 is equipped with a plurality of light guide plates 8, an LED substrate 9, and a long window part 2. The LED substrate 9 includes LEDs mounted thereon to serve as a plurality of light sources provided corresponding to the plurality of light guide plates 8. The window part 2 opens the decorative illumination device 1 from the front surface and the side surfaces which continues from the front surface, in at least two directions. A cover part 3, which is transparent or constituted by a half-mirror, is attached to the window part 2. The plurality of light guide plates 8 is arranged in the vertical direction with gaps therebetween and are in a slanted state where the rear part higher than the front part so that the light emitting surfaces 8c are oriented toward the window part 2.

Figure 6:
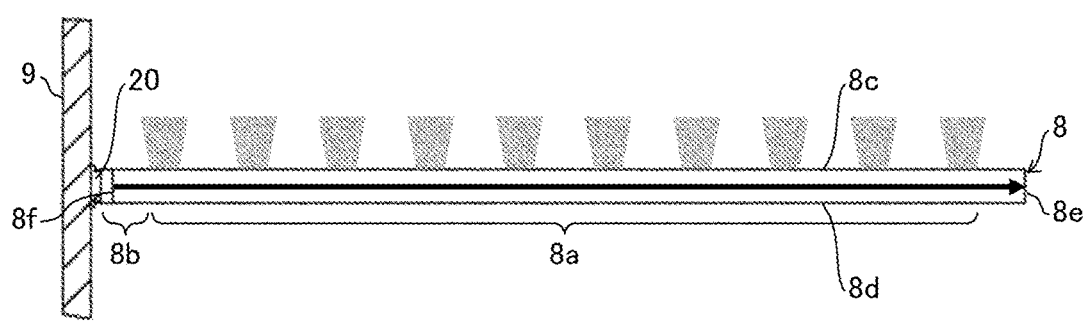
FIG. 6 is a diagram illustrating a cross-sectional view of a section in a horizontal direction, and describing how light is guided in a decorative illumination device.
Figure 7:
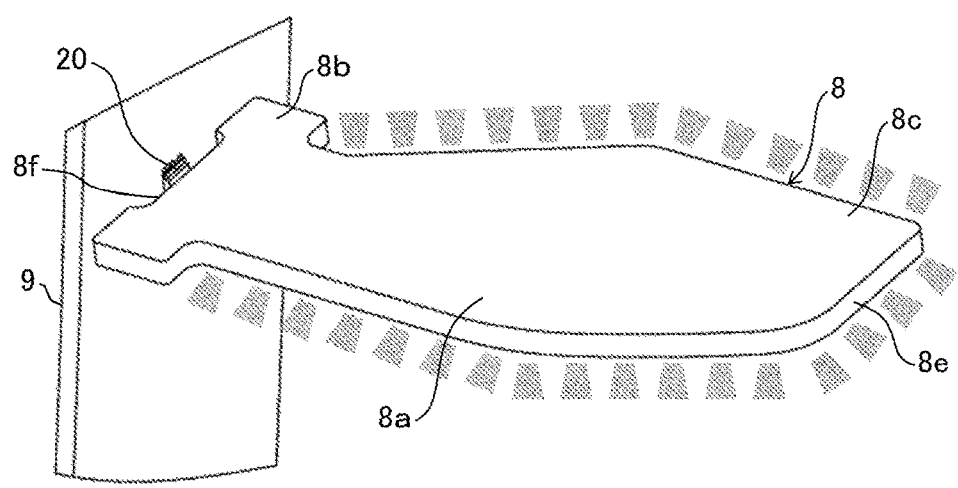
FIG. 7 is a perspective diagram illustrating a light guided in a decorative illumination device.

The window part 2, which is opened in at least the front and a side surface, allows the plurality of light guide plates 8 arranged along the vertical direction to be visible in the decorative illumination device 1. Accounting for the inclination of each of the light guide plates 8 in the arrangement allows not only the light emitting surface 8c but also the outer edges 8e thereof to be visible as illustrated in FIG. 6 and FIG. 7.

Figure 12:
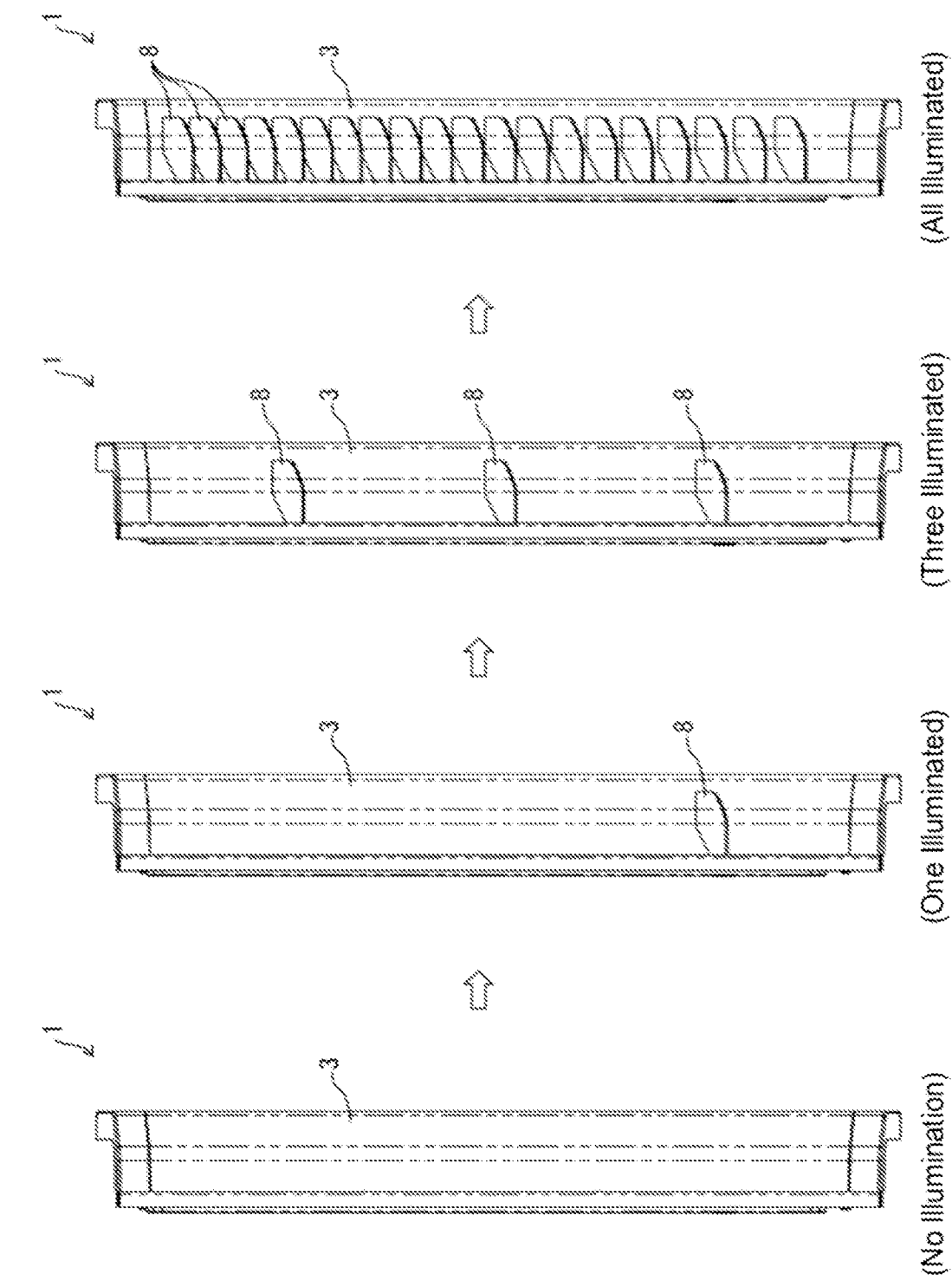
FIG. 12 is a diagram illustrating an example of a decorative illumination device presenting a visual effect.

As illustrated in FIG. 12, it is possible to illuminate any one light guide plate 8, any number of light guide plates 8, or all the light guide plates 8. The outer edges 8e of the light guide plates 8 may be illuminated whereby the respective contour lines appear as bright lines. The inner part of the contour lines allows each of the illuminated surfaces of the light emitting surfaces 8c to appear as bright surfaces because of planar illumination the entire surface or a graphic pattern due to the region in which the recess 18 is formed.

Thus, layering the light guide plates 8 vertically with gaps therebetween, allows a three-dimensional visual effect that is the combination of planar light from the plurality of light emitting surfaces 8c and linear light from the plurality of outer edges 8e; and allows the visual effect to be perceived from at least the front surface and side surface which are open via the window part 2. Consequently, a highly impactful visual effect can be presented to other users around a user who is positioned at the front of the game machine such as a player, or the like.

Figure 14:
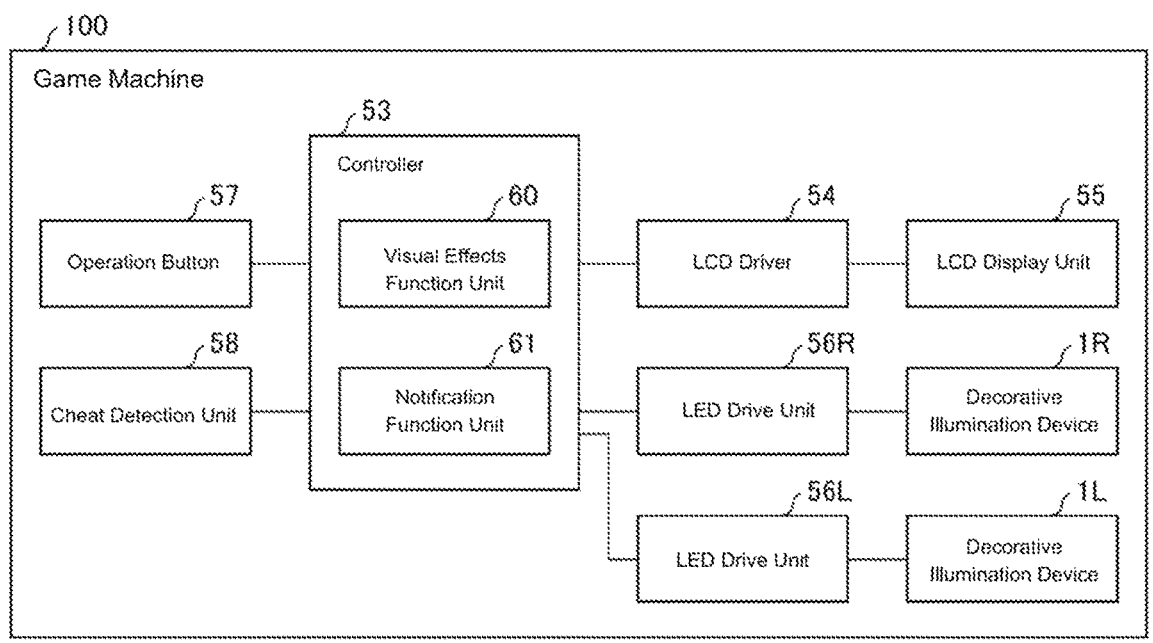
FIG. 14 is a block diagram illustrating functions in a game machine.

Making use of the ability to provide such a three-dimensional effect, the controller 53 in the game machine 100 is configured to control the light emission from the plurality of light guide plates 8 to convey predetermined information as illustrated in FIG. 14. More specifically, the controller 53 is equipped with a presentation function unit 60 for controlling the plurality of light guide plates 8 to perform visual effect lighting having an impactful visual effect; and a notification function unit 61 for controlling light emission from the plurality of light guide plates 8 to convey predetermined information.

Figure 15:
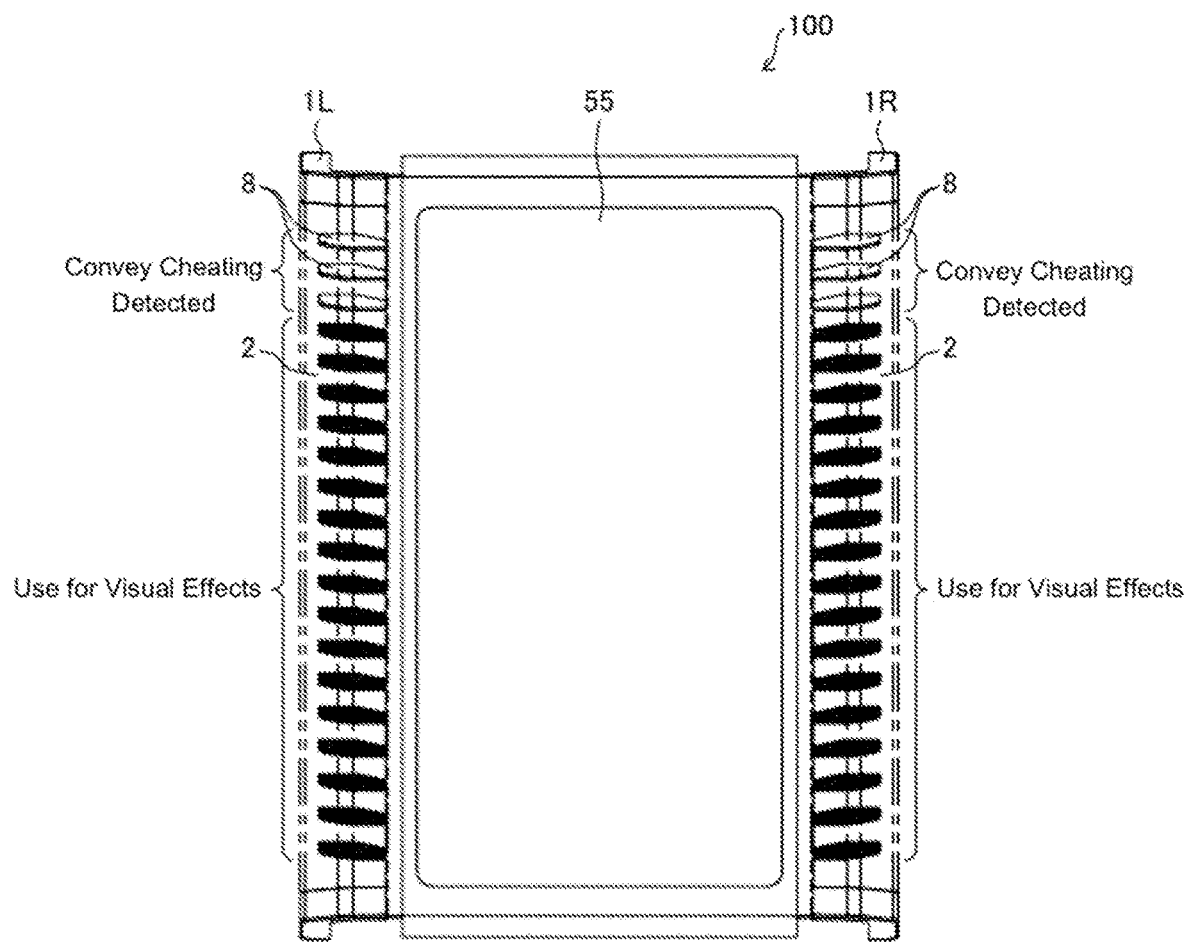
FIG. 15 is a diagram illustrating an example of a notification when there is cheating using two decorative illumination devices mounted on sides of a game machine.

Hereby, as illustrated in FIG. 15 for example, the decorative illumination devices 1R, 1L can be used to convey the information traditionally conveyed by a tower light installed at the top part of a game machine enclosure. Moreover, because the decorative illumination devices 1R, 1L use the plurality of light guide plates 8 provided thereto, a plurality of information can be conveyed. As a result, more information can be conveyed while providing a highly impactful visual effect and minimizing increases in cost.

2. Example Configuration

First Embodiment

An embodiment herein is described below on the basis of FIG. 1 through FIG. 17. The described embodiment involves a decorative illumination device mounted in a game machine.

1. Game Machine Appearance

FIG. 1 is a perspective diagram illustrating an example of a game machine 100 in which a decorative illumination device 1 according to one or more embodiments is mounted. As illustrated in FIG. 1, the decorative illumination device 1 may be installed at the front left and front right edge sections of the enclosure 101 of the game machine 100. The front left and front right edge sections of the enclosure 101 are provided with recesses for inserting a decorative illumination device 1. In the description provided herein, note that the horizontal direction refers to the left-to-right direction when facing the front of the game machine 100.

2. Overview of Decorative Illumination Device 1

FIG. 2 is a perspective diagram illustrating the decorative illumination device 1 when viewed from above while all the light guide plates are illuminated. The decorative illumination device 1 in FIG. 2 is the decorative illumination device 1 attached to the right side edge section of (right side when facing) the game machine 100 in FIG. 1. The decorative illumination device 1 is elongated and is long in the vertical direction; for example, the decorative illumination device 1 may be a length of 120 cm. In the above described embodiment the decorative illumination device 1 includes a curve at the rear part that creates a projection.

As illustrated in FIG. 2, the decorative illumination device 1 includes a window part 2 with front and right side surfaces that are exposed while the window part is inserted in the recess in the enclosure 101 of the game machine 100. The window part 2 is open from at least two directions of the front surface and the side surfaces continuing from the front surface of the device. The visual effect (visual effect lighting) due to light from the plurality of light guide plates 8 provided inside the decorative illumination device 1 can be seen via the window part 2. In the above described embodiment, the window part 2 is provided with a cover part 3 (half-mirror unit) that is made from a half-mirror. The cover part 3 is a single-sheet structure with no joint between the front surface and the right-side surface and the angled portion is chamfered.

A case 10, which is inserted into the recess in the enclosure 101, covers the back surface and left-side surface of the decorative illumination device 1. The plurality of light guide plates 8 is attached to the left-side wall 10b of the case 10. The plurality of light guide plates 8 is arranged in the vertical direction with gaps therebetween and are in a slanted state where the rear part higher than the front part so that the light emitting surfaces 8c are oriented toward the window part 2. Arranging the plurality of light guide plates 8 to slant in the above described way thereby allows light emitted from light emitting surfaces 8c as well as light emitted from the outer edges 8e to be seen. An impactful visual effect that draws the interest of the player, users surrounding the device, and the like can be provided if two or more light guide plates 8 are used; however, the greater the number of light guide plates 8, the more dynamic the visual effect lighting that can be achieved.

A mirror unit 15 is provided on the inner surface of the rear wall 10a of the case 10. The rear wall 10a corresponds to an inner wall that divides the space inside which the plurality of light guide plates 8 are arranged. The mirror unit 15 and cover part 3 which is made of a half mirrors make up the later-described opposing mirrors. The components labeled with reference numerals 6, 7 in the drawing refer to end covers which are inserted in the upper end part and the lower end part of the decorative illumination device 1. Although not illustrated, the structure of the decorative illumination device 1 that is attached to the left-side edge section of the game machine 100 is bilaterally symmetrical to the structure of the decorative illumination device 1 in FIG. 2.

3. Configuration of the Decorative Illumination Device 1

Figure 4:
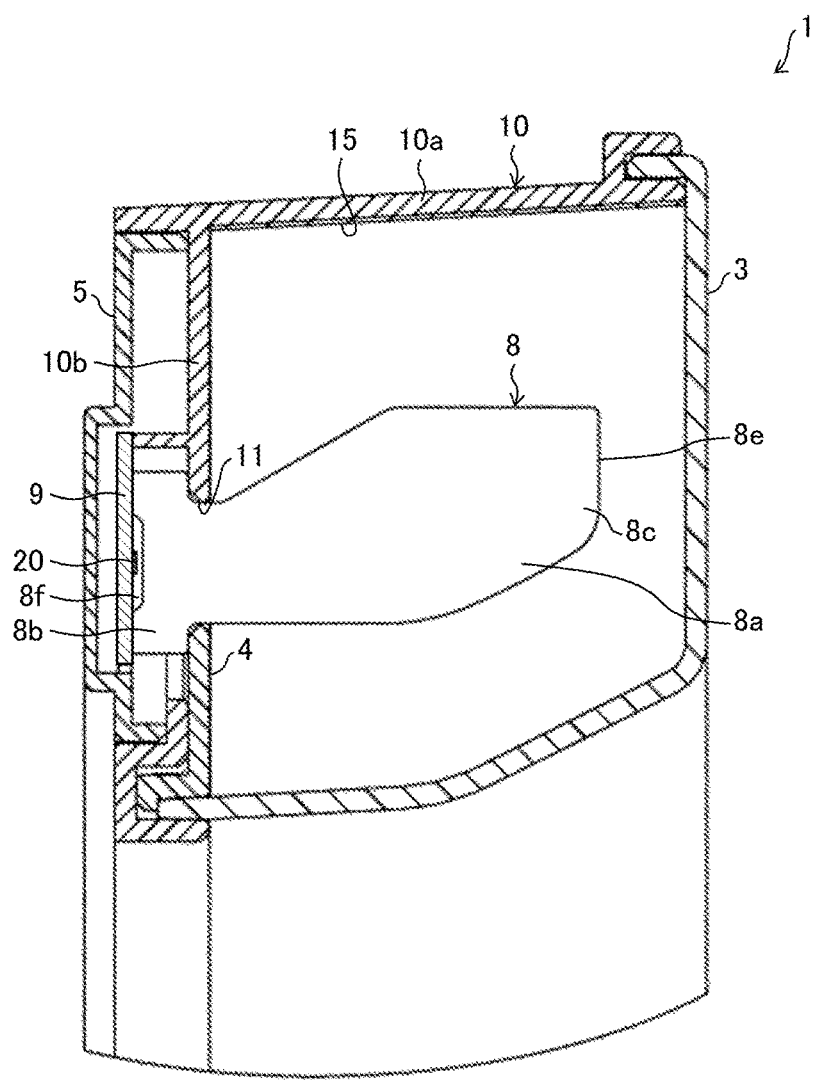
FIG. 4 is a diagram illustrating a cross-sectional view of a decorative illumination device cut parallel to a light emitting surface of a light guide plate.

FIG. 3 is an exploded perspective diagram illustrating a configuration of the above decorative illumination device 1; and FIG. 4 is a cross-sectional view of the above decorative illumination device 1 cut parallel to the light emitting surface 8c of a light guide plate 8. As illustrated in FIG. 3 and FIG. 4, other than the cover part 3, case 10, plurality of light guide plates 8 and end covers 6,7 previously described, the decorative illumination device 1 is provided with an LED substrate 9, a substrate cover 5 and an inner cover 4. The cover part 3, case 10, substrate cover 5, LED substrate 9, and inner cover 4 are elongated to match the external shape of the decorative illumination device 1.

The case 10 supports the components making up the decorative illumination device 1, and the cross-section thereof cut in the transverse direction in which the front side and right side are open, is L-shaped. The case 10 includes a rear wall 10a and a left-side wall 10b with upper wall 10c and lower wall 10d at the upper end and the lower end.

The left-side wall 10b has a plurality of fixing holes 11 formed along the vertical direction for supporting the light guide plate 8. The fixing holes 11 are inclined relative to the longitudinal direction (depth direction) with the front part low and the rear part high so that the light guide plates 8 are supported with the light emitting surfaces 8c sloped diagonally upward. The inclination angle of the fixing hole determines the inclination angle of the light guide plate 8 and the pitch of the fixing hole 11 determines the pitch of the gap between the light guide plates 8. The fixing holes 11 are through holes in the thickness direction of the left-side wall 10b, and the base part 8b of the light guide plate 8 (later described; see FIG. 5) is inserted into the fixing hole 11.

A plurality of LEDs 20 (light sources) for the plurality of light guide plates 8 are aligned in the vertical direction on the LED substrate 9. The LED substrate 9 is arranged at the rear side (outside) of the left-side wall 10b so that the LEDs 20 correspond to the locations of the plurality of fixing holes 11. Therefore, the LEDs 20 face the outer edge 8f of the base part 8b of the light guide plates 8 installed in the fixing holes 11. The substrate cover 5 is fitted to the rear side of the left-side wall 10b to cover the LED substrate 9.

As previously described, mirror unit 15 is provided on the inner surface of the rear wall 10a of the case 10. The mirror unit 15 functions to reflect light, and reflects an image that is a reverse of the image that can be seen from the plurality of light guide plates 8 via the window part 2.

The plurality of light guide plates 8 are made from a transparent polycarbonate or acrylic resin. The plurality of light guide plates 8 is installed respectively in the plurality of fixing holes 11 formed in the left-side wall 10b.

Figure 5:
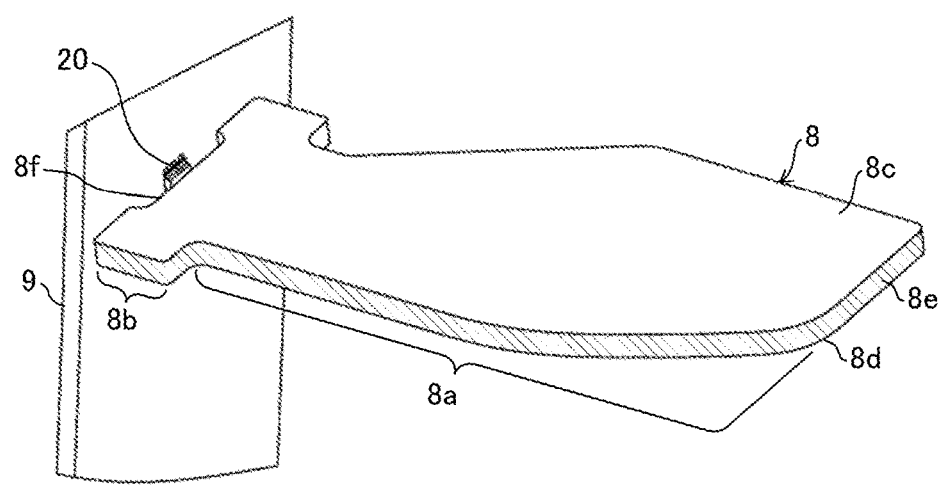
FIG. 5 is a perspective diagram illustrating a light guide plate and an LED substrate in a decorative illumination device.

FIG. 5 is a perspective diagram illustrating a light guide plate 8 and an LED substrate 9. As illustrated in FIG. 5, the light guide plate 8 includes a main part 8a of a desired shape and a base part 8b for attaching the light guide plate 8 to the left-side wall 10b; the main body 8a lights up when the LED 20 is turned on. The boundary section between base part 8b and the main part 8a is narrow. The outer edge 8f at the base part 8b facing the LED 20 is the light input surface. In the above described embodiment, the portion of the base part 8b facing the LED 20 includes a cavity that the LED 20 enters.

Recesses 18 (dimples) are formed on the rear surface 8d (reflection surface) that is opposite the light emitting surface 8c in the main part 8a (FIG. 10); the recesses 18 are for reflecting the light guided inside the main part 8a, causing the light to be emitted from the light emitting surface 8c. The light reflected by the recesses 18 are emitted from the light emitting surface 8c and thereby illuminate the light emitting surface 8c. The recesses 18 may be formed over the entire rear surface 8d of the main part 8a to obtain global illumination of the main part 8a, or may be formed on a portion of the rear surface 8d to create a design or pattern. Moreover, the light guided inside the light guide plate 8 may also be diffused and emitted from an outer edge 8e which is given an oblique line to also illuminate the outer edge 8e of the main part 8a.

Returning to FIG. 3 and FIG. 4, the inner cover 4 is at the front side of the surface inward of the left-side wall 10b. The inner cover 4 is fitted with the plurality of light guide plates 8 inserted into the plurality of fixing holes 11. The inner cover 4 covers the front side of the fixing holes 11, and thereby, the base part 8b of the light guide plates 8 is supported so that the base part 8b is held by the cavity behind the fixing hole 11 and the back end of the inner cover 4, thus securing the light guide plate 8 to the left-side wall 10b.

The cover part 3 is for covering the front surface and left surface which are open in the case 10; similarly to the case 10, the cross-section of the cover part 3 cut in the transverse direction is L-shaped, thus creating a corner shape. The cover part 3 is fitted to the case with the inner cover 4 attached to the case 10. The cover part 3 in the present embodiment, is constituted by a half-mirror as previously described. The half-mirror functions to reflect light and to transmit light.

4. Light Guiding in the Decorative Illumination Device 1

FIG. 6 and FIG. 7 are for describing light guided in the decorative illumination device 1; FIG. 6 uses a cross-sectional view cut in the horizontal direction, and FIG. 7 uses a perspective view. The light guide path for light from the LED 20 is depicted with a thick arrow in FIG. 6. Additionally, only the light guide plate 8 and the LED substrate 9 are depicted in FIG. 6 and FIG. 7.

As illustrated in FIG. 6, light emitted from the LED 20 enters the light guide plate from the outer edge 8f facing the LED 20. The light entering inside the light guide plate 8 is totally reflected between the light emitting surface 8c and the rear surface 8d while advancing therethrough. The light traveling through the light guide plate 8 and reflected by the recesses 18 formed on the rear surface 8d is emitted from the light emitting surface 8c and illuminates the light emitting surface 8c. Additionally, the light advancing through the light guide plate 8 and arriving at the outer edge 8e is diffused by the outer edge 8e and illuminates the outer edge 8e as illustrated in FIG. 7.

5. Shape of the Recesses in the Light Guide Plate 8

Figure 8:
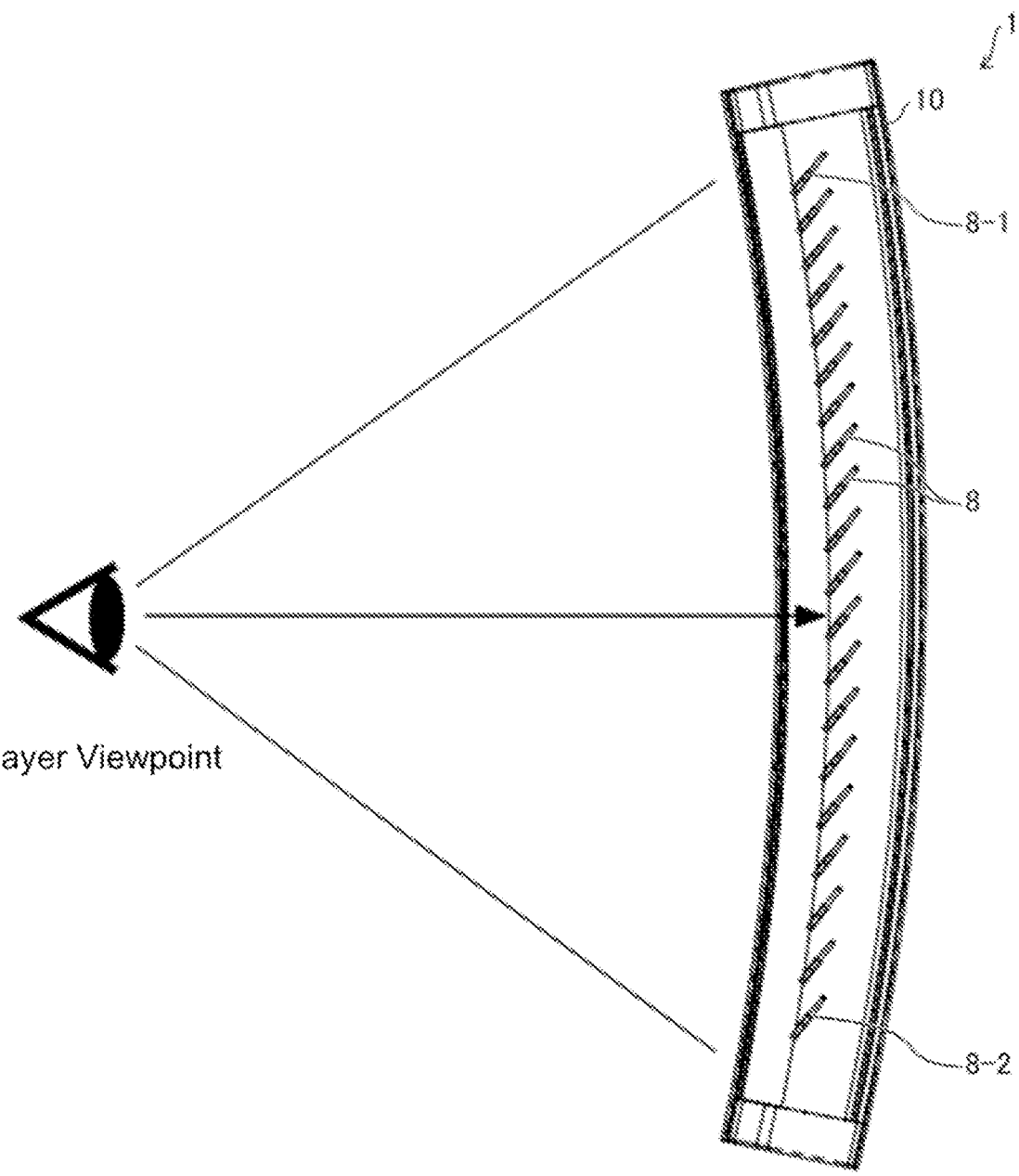
FIG. 8 is a diagram illustrating a relationship between a plurality of light guide plates in a decorative illumination device and a viewing position of a player.

FIG. 8 is a diagram illustrating the relationship between the plurality of light guide plates 8 in the decorative illumination device 1 and the viewing position of a player. As illustrated in FIG. 8, the light guide plates 8 and the viewing position of the player differs in the vertical direction because the plurality of light guide plates 8 is arranged along the vertical direction. The travel direction of the light emitted from each of the light emitting surfaces 8c of the light guide plates 8 is established so that the advancing direction is toward the viewing position of the player. The travel direction of the light emitted from a light emitting surface 8c is determined in accordance with the shape of the recesses 18 formed on the rear surface 8d. Because the viewing position of the player changes with the height of the player, the average height and the like is considered when determining the travel direction.

Figure 9:
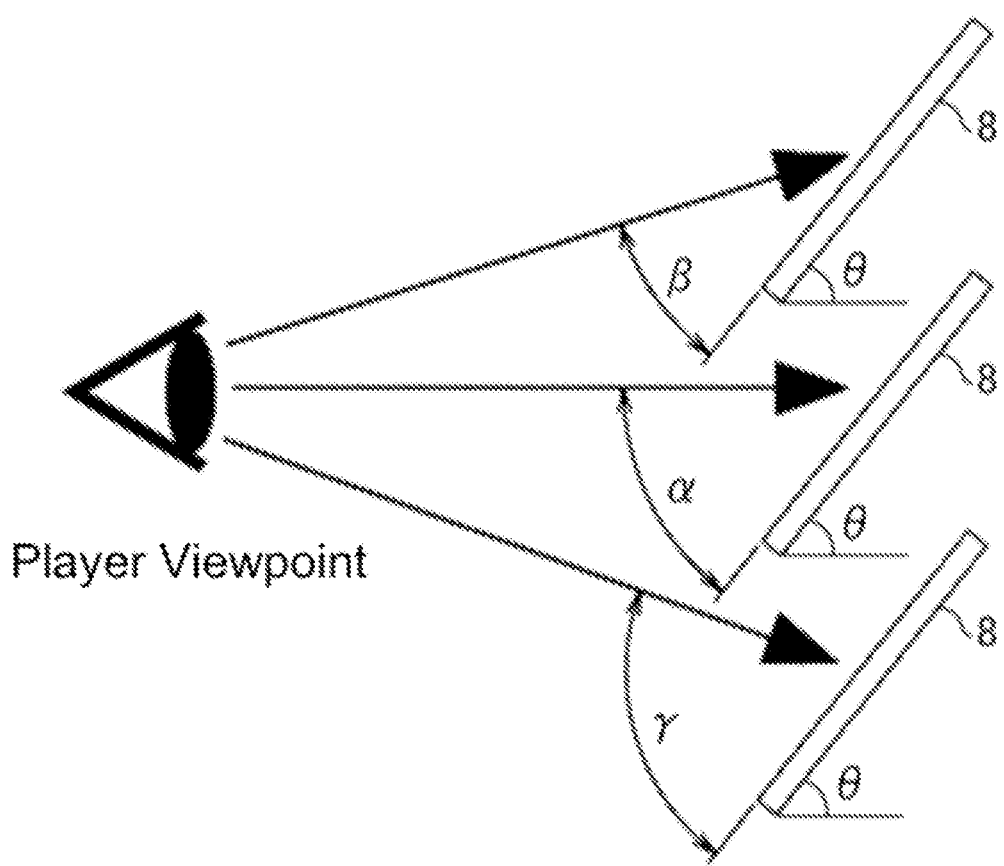
FIG. 9 is a diagram illustrating a difference in an angle formed between a light emitting surface and a player's line-of-sight due to a difference in a vertical position of a light guide plate.

FIG. 9 is for describing the difference in the angle formed between the light emitting surface 8c and the player's line-of-sight due to the difference in the vertical position of a light guide plate 8. As illustrated in FIG. 9, when the angle of inclination relative to the longitudinal direction of the light guide plate 8 is θ, the angle created by the light emitting surface 8c and the player's line-of-sight is γ>α>β, and grows larger for the light guide plate 8 located toward the bottom and smaller for the light guide plates 8 located toward the top. The shape of the recesses may be designed with the above points in mind so that the light emitted from the light emitting surfaces 8c of the light guide plates 8 travel parallel to the player's line of sight to arrive at the player's viewpoint.

Figure 10:
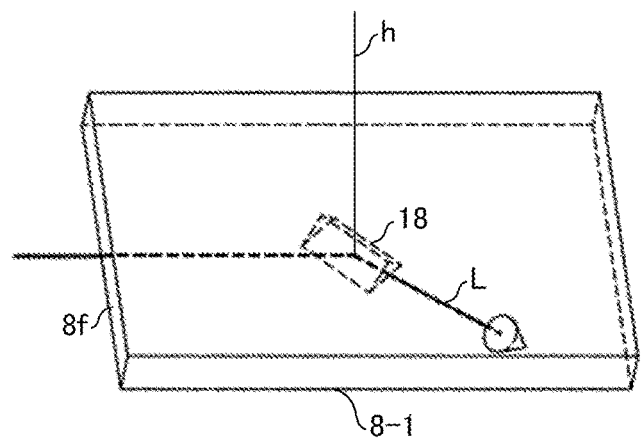
FIG. 10 is a diagram illustrating, conceptually, a difference in a recesses formed in a rear surface due to a difference in a vertical position of a light guide plate.
Figure 10:
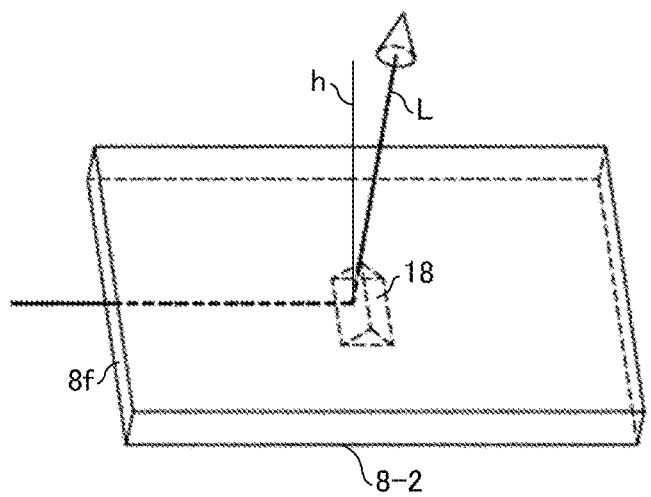

FIG. 10 is for describing, conceptually, the difference in the recesses 18 formed in the rear surface 8d due to the difference in vertical position of the light guide plate 8. The line segment h in FIG. 10 is normal to the light emitting surface 8c. The recesses 18 formed in the light guide plate 8-1 (see FIG. 8) at the highest location are formed to emit the light L entering from the outer edge 8f at shallow angle relative to the light emitting surface 8c. In other words, the recesses 18 formed in the light guide plate 8-1 emit the light L entering from the outer edge 8f at a steep angle relative to the line segment h.

Meanwhile, the recesses 18 formed in the light guide plate 8-2 (see FIG. 8) at the lowest location are formed to emit the light L entering from the outer edge 8f at steep angle relative to the light emitting surface 8c. In other words, the recesses 18 formed in the light guide plate 8-2 emit the light L entering from the outer edge 8f at a shallow angle relative to the line segment h.

6. Appearance of the Light Guide Plates 8 Illuminated in the Decorative Illumination Device 1

Figure 11:
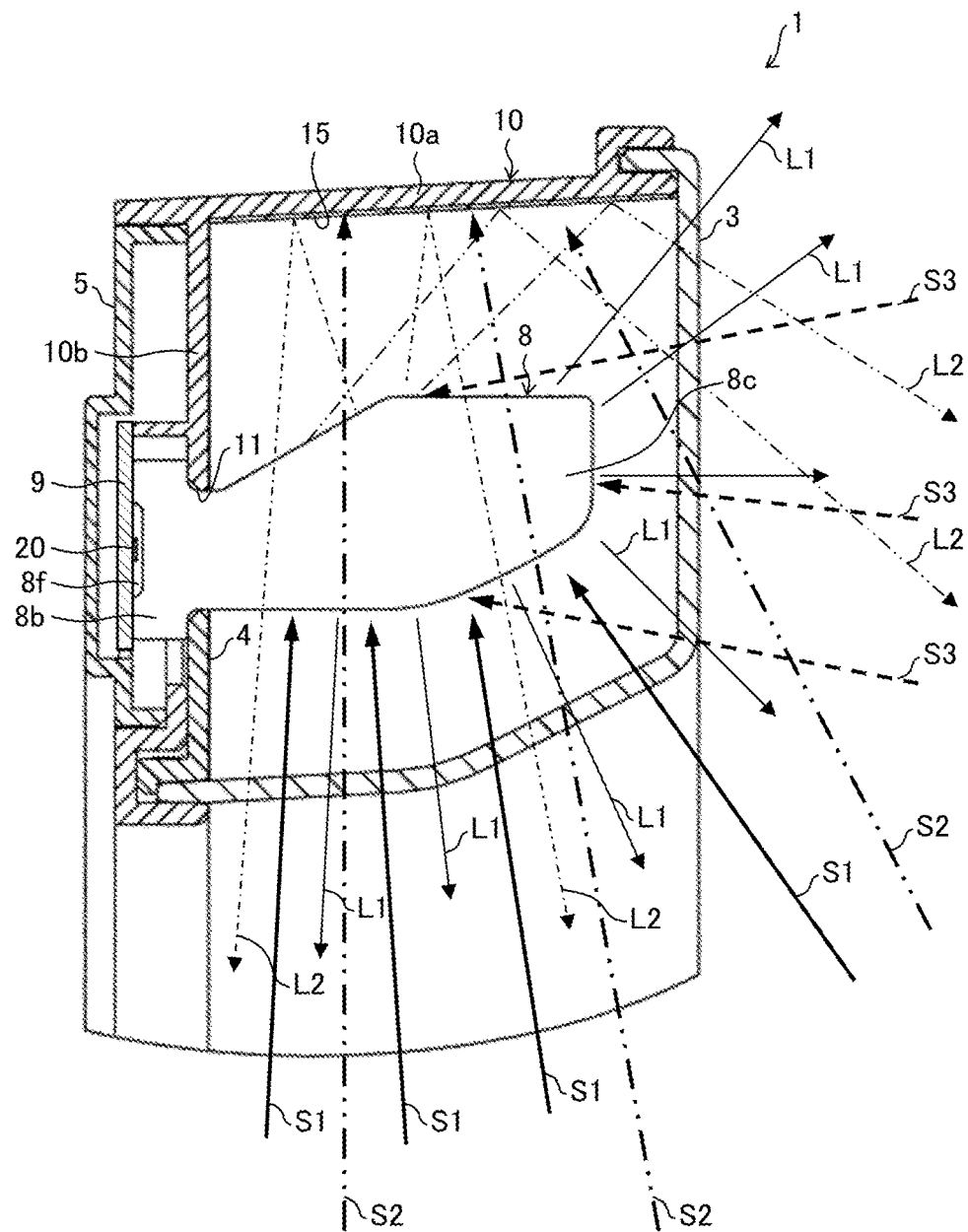
FIG. 11 is a diagram illustrating a concept of light emission from an illuminated light guide plate in a decorative illumination device and a concept of perception.

FIG. 11 is for describing the concept of light emission from an illuminated light guide plate 8 in the decorative illumination device 1 and the concept of perception. FIG. 11 is a diagram illustrating the same cross-sectional view as FIG. 4. It is possible to cause the plurality of light guide plates 8 to light individually and selectively, and various visual effects are possible by changing the color and timing of light emitted to change the light emission pattern.

When the LED 20 is turned on, light from the LED 20 enters the light guide plate 8 from the outer edge 8f and illuminates the light emitting surface 8c and the outer edge 8e of the light guide plate 8 (see FIG. 6 and FIG. 7). The illumination of the light guide plates 8 brightens inside the decorative illumination device 1, and the light inside passes through the cover part 3 which is constituted by a half-mirror, making it possible to see inside the decorative illumination device 1.

The light from the decorative illumination device 1 is the direct light L1 from the light guide plates 8, which is depicted by the thin solid arrows, and the reflection light L2 from the mirror unit 15, which is depicted by the thin dash double-dot lines. The direct light L1 includes the light traveling from the light emitting surface 8c of the light guide plate 8 in a direction established by the recesses 18, and the diffused light emitted from the outer edge 8e of the light guide plate 8 in various directions.

The user's line-of-sight is the line-of-sight S1, which is depicted by a thick solid arrow, the line-of-sight S2, which is depicted by a thick dash double-dot arrow, and the line-of-sight S3, which is depicted by a thick dotted arrow. The line-of-sight S1 is the line-of-sight along which a user such as a player or the like, positioned in front can see the light guide plates 8 directly. The line-of-sight S2 is the line-of-sight along which a user, e.g., a player positioned in front of the device, can see the light guide plates 8 reflected in the mirror unit 15. The line-of-sight S3 is the line-of-sight along which a surrounding user positioned at the side can see the light guide plates 8 from the side.

A user such as a player or the like, positioned in front of the device and a surrounding user positioned at the side can see the direct light L1 from the light guide plates 8 and the reflection light L2 reflected from the mirror unit 15. The shape of the recesses 18 are set so that the emission light from the light emitting surfaces 8c of the light guide plates 8 travel toward a player located in front; therefore, the direct light and the diffused light emitted from the outer edge 8e causes the player to see bright light. A surrounding user cannot see the light as brightly as the player; however, the surrounding user does see a bright form that coincides with the contour shape of the light guide plates 8.

7. Example of Presenting Effects in the Decorative Illumination Device 1

FIG. 12 is for describing an example of the decorative illumination device presenting a visual effect. As illustrated in FIG. 12, the cover part 3 is mirrored, and made up of half-mirrors because the inside of the decorative illumination device 1 is dark when all the light guide plates 8 are not illuminated. Illuminating any given one of the light guide plates 8 brightens around the illuminated light guide plate 8; therefore, light permeates the cover part 3 at that portion allowing the illuminated light guide plate 8 to be seen. Because light permeates one portion of the mirrored cover part 3 and allows the light guide plate 8 inside to be seen, a magical visual effect may be provided where the light guide plate 8 appears as if it were floating in midair. Any number of light guide plates 8 among the plurality of light guide plates 8 may be illuminated to thereby create a visual effect where a plurality of light guide plates 8 appear to be floating in midair. All the light guide plates 8 may be illuminated thereby allowing the light inside to pass through the cover part 3 and all the illuminated light guide plates 8 to be seen.

Additionally, the light guide plates 8 that are illuminated may change in order from top to bottom or from bottom to top to thereby perform a visual effect where an object in the shape of the light guide plates 8 appears to move from top to bottom or from bottom to top. Additionally, the color emitted from all the light guide plates 8 may change as the light guide plates 8 are illuminated from top to bottom or from bottom to top to thereby perform a visual effect where a band of light appears to move from top to bottom or from bottom to top.

8. Visual Effects in the Decorative Illumination Device 1

Thus, the plurality of light guide plates 8 in the decorative illumination device 1 is arranged in the vertical direction with gaps therebetween and are slanted with the rear part higher up than the front part so that the light emitting surfaces 8*c* are oriented toward the window part 2. The window part 2 is open from at least two directions of the front surface and the side surfaces continuing from the front surface of the device.

Hereby, the window part 2, which is opened at the front and side surface, allows the plurality of light guide plates 8 arranged along the vertical direction to be visible. The light emitting surfaces 8*c* and the outer edges 8*e* of the light guide plates 8 can be made visible by accounting for the inclination of the light guide plates 8. The outer edges 8*e* may be illuminated whereby the respective contour lines appear as bright lines. The inner part of the contour lines allows each of the illuminated surfaces of the light emitting surfaces 8*c* to appear as bright surfaces because of planar illumination the entire surface or a graphic pattern due to the region in which the recess 18 is formed.

Thus, layering the light guide plates 8 vertically with gaps therebetween, allows for a three-dimensional visual effect that is the combination of planar light from the plurality of light emitting surfaces 8*c* and linear light from the plurality of outer edges 8*e*. Consequently, a highly impactful visual effect can be presented to other users around a user who is positioned at the front of the game machine such as a player, or the like.

The mirror unit 15 provided on the inner surface of the rear wall 10*a* also allows the image of the light guide plates 8 reflected on the mirror unit 15 to be perceived. That is, the light emitted from the outer edges 8*e*, which are located opposite the window part 2, and the light leaking out from the rear surface of the light guide plates 8, and the like are mirrored on and reflected by the mirror unit 15. Hereby, the light that originally could not be seen from the window part 2 can be presented to the user, making it possible to provide a more superior visual effect that is impactful.

Further, because the cover part 3 is constituted by a half-mirror, illuminating, for example, one light guide plate 8 or several light guide plates 8 among the plurality of light guide plates 8 with gaps therebetween, presents the observer and optical illusion as if the light guide plate 8 were floating in midair, creating a magical visual effect.

Moreover, the combination of the mirror unit 15 and the half-mirror creates opposite mirrors, which creates more than the actual number of illuminated light guide plates 8 to be mirrored in the depth direction, and thus allows for creating an even more magical visual effect.

9. Control System in the Decorative Illumination Device 1

Figure 13:
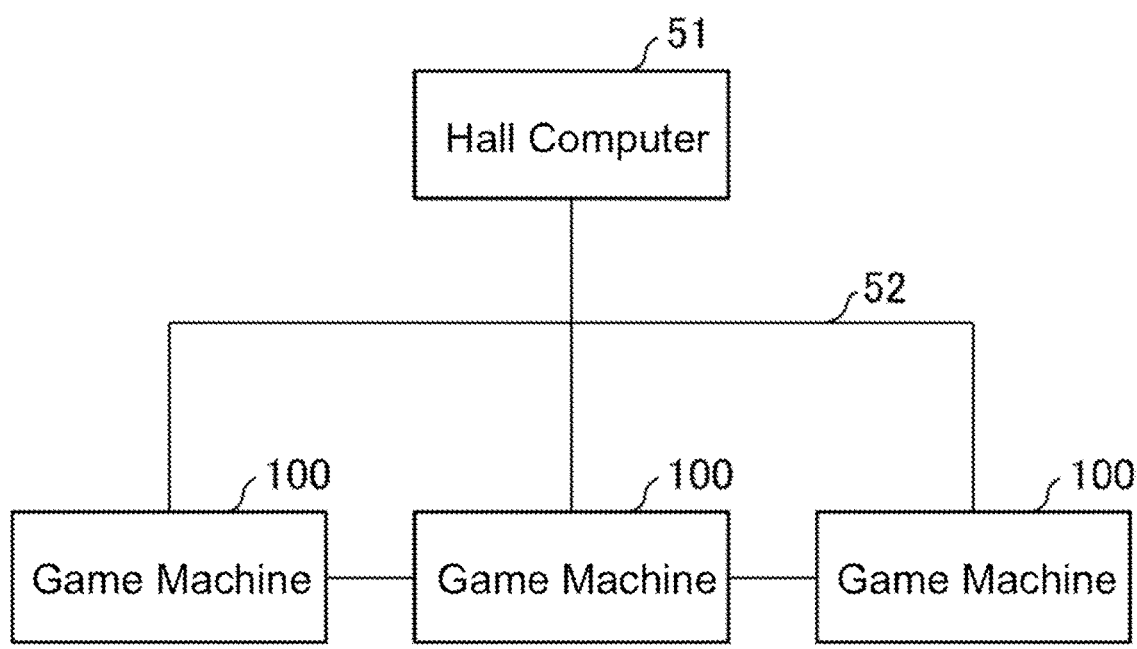
FIG. 13 is a block diagram illustrating a system configuration of a hall where a plurality of game machines with a decorative illumination device mounted thereon are connected via a network.

Next the control system in the decorative illumination device 1 is described. FIG. 13 is a block diagram illustrating the system configuration of a hall where a plurality of game machines 100 with the above decorative illumination device 1 mounted thereon are connected via a network. As illustrated in FIG. 13 a hall computer 51 in an amusement center and the plurality of game machines 100 are connected via a communication network 52 to allow for communication. Various information is sent from the hall computer 51 to the game machines 100, and various information is sent from the game machines 100 to the hall computer 51.

The hall computer 51 controls the display of visual effects by the decorative illumination device 1 of the game machines 100 all together, and allows for presentation of visual effects that have a sense of unity that is coordinated among the different game machines 100. The hall computer 51 also manages the information in the game machines 100, and is capable of directing the decorative illumination device 1 to convey information on the basis of the information managed. The notification information may include credit amount, payout amount, number of successes today, time of success today, and the like in each of the game machines 100. The notification information may include the number of jackpots or number of small prizes, or the like in each of the game machines 100. Of course, the above described kind of notification information may be managed by the game machine 100 itself instead of through the hall computer 51, and the game machine 100 may direct the decorative illumination device 1 to provide a notification.

FIG. 14 is a block diagram illustrating the functions in the above game machine 100. As illustrated in FIG. 14, the game machine 100 is provided with a controller 53, an LCD display unit 55, an LCD driver 54, an operational input button 57, a cheat detection unit 58, a decorative illumination devices 1R, a decorative illumination device 1L, an LED drive unit 56R, an LED drive unit 56L, and the like. Hereafter, the decorative illumination device 1 is illustrated separately as the decorative illumination device 1R or the decorative illumination device 1L depending on the installation location of the device.

The LCD display unit 55 is for displaying an image for the game, and the LCD driver 54 drives the LCD display unit 55. The operational input button 57 accepts operational input in accordance with the image displayed on the LCD display unit 55 for the game. A player uses the operational input button 57 to play the game.

The decorative illumination device 1R and decorative illumination device 1L are each a decorative illumination device 1 arranged on the left and right sides of the game machine 100. The decorative illumination device 1R is the decorative illumination device 1 on the right side when facing the game machine, and the decorative illumination device 1L is the decorative illumination device 1 on the left side when facing the game machine. The LED drive unit 56R is for driving the LEDs 20 on the LED substrate 9 mounted in the decorative illumination device 1R. The LED drive unit 56L is for driving the LEDs 20 on the LED substrate 9 mounted in the decorative illumination device 1L.

The cheat detection unit 58 detects impropriety with respect to the game machine 100 and sends a cheat detection signal to the controller 53 when impropriety is detected. The cheat detection unit 58 sends the cheat detection signal when, for instance, a liquid is poured on the game machine 100, the game machine 100 is subject to vibrational impact, or unauthorized radio or magnetic waves are detected around the game machine 100. The cheat detection unit 58 also sends a cheat detection signal when communication is lost between the game machine 100 and the hall computer 51, or there is a difference between a drawing and a jackpot status, or the like.

The controller 53 controls the game machine 100 and is made up of a CPU, ROM, and RAM, and the like. The controller 53 provides the image for a game that is displayed on the LCD display unit 55 via the LCD driver 54 and performs a drawing due to operation of the operational input button 57.

Moreover, in the present embodiment, the controller 53 also functions as a control device for the decorative illumination device and controls the driving of the decorative illumination device 1R and the decorative illumination device 1L. The controller 53 controls the driving of the decorative illumination device 1R and the decorative illumination device 1L via the LED drive unit 56R and the LED drive unit 56L to perform visual effect lighting and information notification by conveying predetermined information. The controller 53 is provided with visual-effect function unit 60 and notification function unit 61 to perform these controls.

The visual effects function unit 60 controls the light emission from the plurality of light guide plates 8 in the decorative illumination device 1R and the decorative illumination device 1L to perform visual effect lighting. The visual effect causes a plurality of light guide plates 8 to emit light to thereby provide a dazzling presentation on the game machine 100 with the aim of drawing a player's interest to the game.

The notification function unit 61 controls the light emission from the plurality of light guide plates 8 in the decorative illumination device 1R and the decorative illumination device 1L to convey predetermined information. The information notification causes a plurality of light guide plates 8 to emit light with the aim of conveying various information to a manager and a player.

The information conveyed by the notification function unit 61 may be, for instance, information indicating the operation state of the game machine 100, information indicating the open or closed state of the door to the game machine 100, or information indicating that the game machine is experiencing an error, or the like. The above described information is information that was traditionally conveyed by a tower light installed at the top part of a game machine enclosure.

One of the pieces of information that the notification function unit 61 can convey also includes information that cheating occurred with respect to the game machine 100. On receiving a cheat detection signal from the cheat detection unit 58, the notification function unit 61 conveys that there was cheating.

The information that was conveyed by a tower light installed at the top part of a game machine enclosure, and the information that was to convey that there was cheating, can be conveyed using either or both of the decorative illumination device 1R and the decorative illumination device 1L. Further, in terms of visibility of the notification information for an employee or manager of the hall, it is preferable that both the decorative illumination device 1R and the decorative illumination device 1L are used.

Similarly, in terms of the ease of seeing the information conveyed, the information to be conveyed is preferably conveyed by controlling the light emission of a predetermined plurality of light guide plates 8 located at the top part in the decorative illumination device 1R and the decorative illumination device 1L. Using the light guide plates 8 located at the top part reduces the likelihood the light guide plates 8 are at a blind spot, allows for confirmation even from a location away from the game machine 100, and secures a visibility comparable to that of the conventional tower light.

A notification of cheating, in particular, may be provided by causing a plurality of light guide plates 8 located at the top part of the device to emit light in a specific light emission pattern that is recognizable to preferably only the manager or employee of the hall as a notification of cheating. Hereby, the cheating can be conveyed in form that appears as part of the visual effect, and an employee can go to deal with the cheating without the player involved in the impropriety being aware of there was a notification of the cheating.

The notification function unit 61 conveys information related to a numerical value with several of the light guide plates 8 in the decorative illumination device 1R and decorative illumination device 1L that the notification function unit 61 causes to emit light. In the present embodiment, the notification function unit 61 conveys information related to mutually related numerical values with several of the light guide plates 8 in the decorative illumination device 1R and decorative illumination device 1L that the notification function unit 61 causes to emit light.

The information related to numerical values that are mutually related may be, for instance, the previously-mentioned credit amount and payout amount of the game machine 100, the number of successes today and the time of success today on the game machine 100. The information related to numerical values that are mutually related may also be the number of jackpots and number of small prices in the game machine 100, and the number of successes and time of success, and the like in the game machine 100.

Here, with regard to the credit amount and the payout amount of the game machine 100, while the game machine 100 is operating, the credit amount and payout amount for a player currently playing a game may be conveyed, and while the game machine 100 is not operating, the credit amount and payout amount for the entire day for said game machine 100 may be conveyed.

The visual effects function unit 60 preferably controls the light guide plates 8 of the plurality of light guide plates not used by the notification function unit 61 for conveying information to perform decorative illumination. That is, while the notification function unit 61 is conveying information, among the plurality of light guide plates 8, the visual effects function unit 61 uses light guide plates 8 not being used by the notification function unit 61 to perform the visual effect lighting. Hereby, the visual effects may continue without interruption even while the notification function unit 61 is conveying information, and thus effectively minimizes degradation in the impact of the visual effect due to conveying the information.

In order to minimize degradation in the impact of the visual effect due to conveying information, the notification function unit 61 may also preferably convey predetermined information by interrupting the visual effect from the visual effects function unit 60. In the present embodiment, the notification function unit 61 determines whether the timing is one where information should be conveyed, or whether information that should be conveyed has been produced; and predetermined information is conveyed when the determination is 'YES'.

As an example, information on the previously mentioned credit amount, payout amount, number of successes today and time of success, number of jackpots and number of small prizes, number of successes and time of success, and the like may be conveyed at s decided time such as at 30-second intervals every five minutes. Alternatively, when provided with a motion sensor or the like, the information may be conveyed for a certain number of seconds when a player is detected in front of the game machine 100.

10. Example of the Decorative Illumination Device 1 Conveying Information

FIG. 15 is for describing an example of a notification provided when there is cheating using the decorative illumination device 1R and the decorative illumination device 1L mounted on the sides of the game machine 100. As illustrated in FIG. 15, the top three light guide plates 8 (in white), which are easy-to-spot from a distance away from the decorative illumination device 1R and the decorative illumination device 1L, are used in conveying cheating; the remaining light guide plates 8 (in black) are used for visual effects.

When the cheat detection unit 58 in the game machine 100 detects impropriety, the notification function unit 61 causes light emission from the top three light guide plates 8 in the decorative illumination device 1R and decorative illumination device 1L to light in a predetermined pattern. As an example, the light guide plates may light yellow, red, yellow, in order from the top. The top three light guide plates 8 may be unlit or may serve as one part of a visual effect when no impropriety has been detected. The light guide plates 8 other than the top three emit light for the purpose of visual effect.

Figure 16:
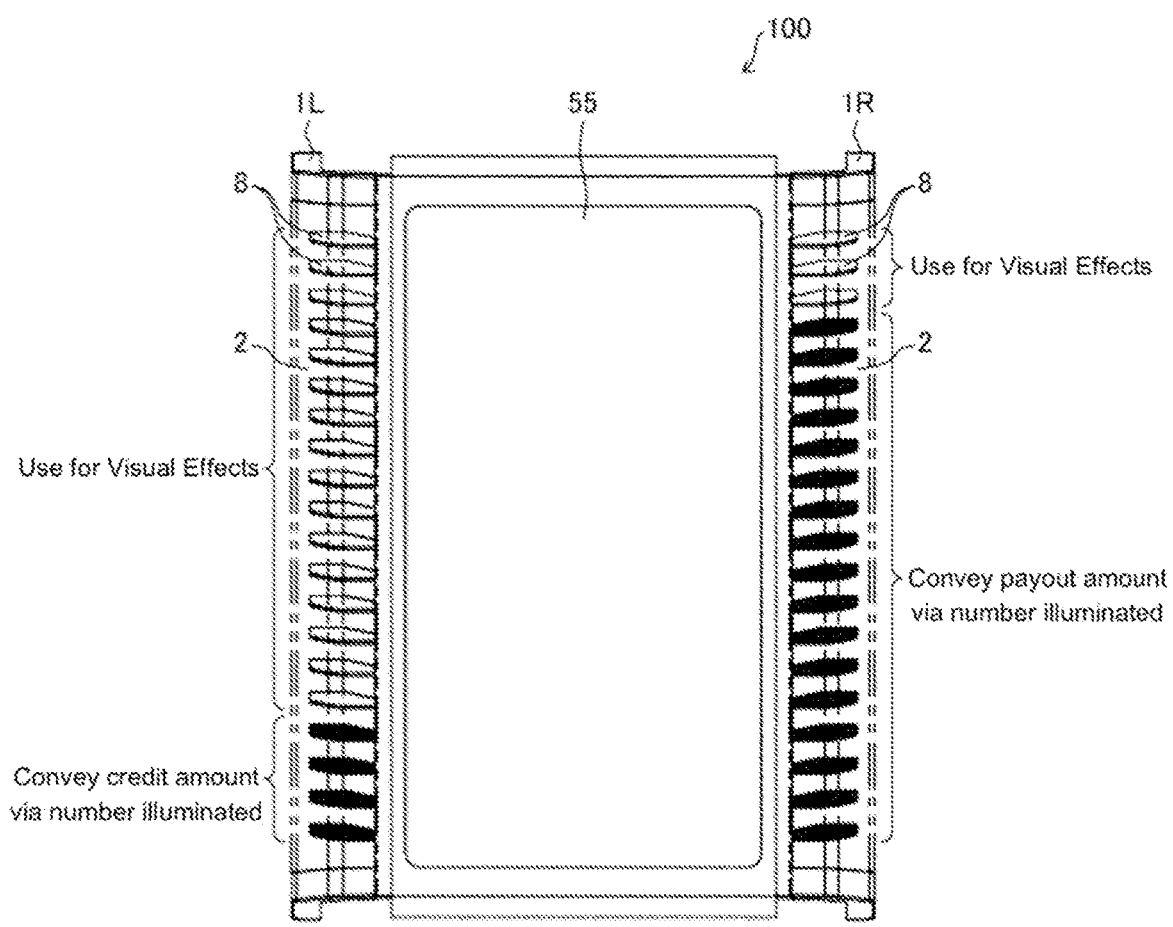
FIG. 16 is a diagram illustrating an example of a notification of a credit amount and a payout amount using two decorative illumination devices mounted on the sides of a game machine.

FIG. 16 is for describing an example of a notification provided of the credit amount and the payout amount using the decorative illumination device 1R and decorative illumination device 1L mounted the sides of the game machine 100. As illustrated in FIG. 16, the credit amount is indicated by the number of light guide plates 8 (in black) that are illuminated from the bottom in the decorative illumination device 1L. The payout amount is indicated by the number of light guide plates 8 (in black) that are illuminated from the bottom of the decorative illumination device 1R. The greater the number of light guide plates 8 that are shown in black, the greater the credit amount and payout amount that is represented. The light guide plates 8 (in white) which are outside the light guide plates 8 being used for notification and depicted in black may remain unlit or may serve as one part of a visual effect.

11. Light Emission Process in the Decorative Illumination Device 1

Figure 17:
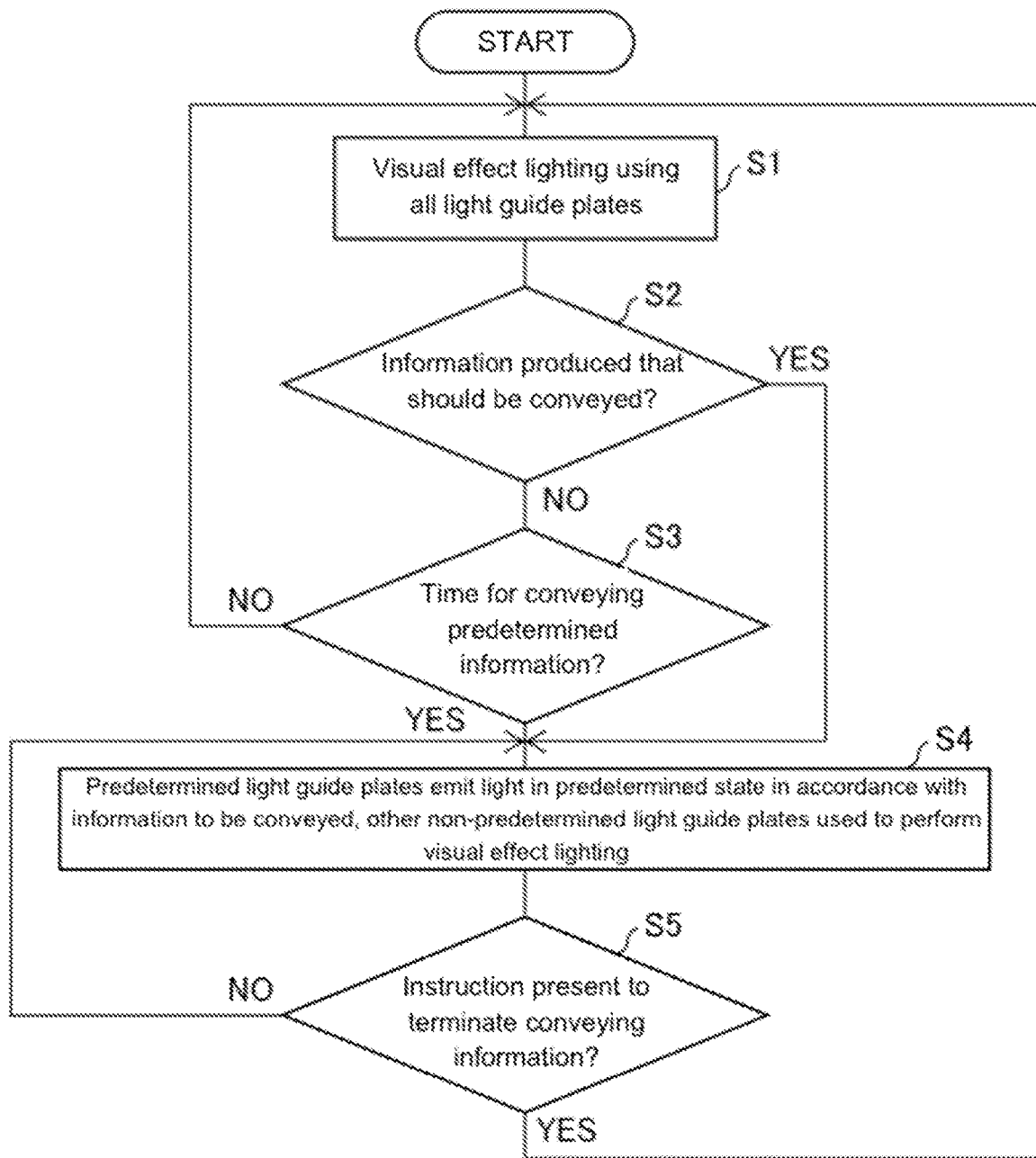
FIG. 17 is a flowchart illustrating light emission processing performed by a controller in a game machine for two decorative illumination devices mounted one on each side of the game machine.

FIG. 17 is a diagram illustrating a flowchart of a light emission processing performed by the controller 53 for the decorative illumination device 1R and decorative illumination device 1L. As illustrated in FIG. 17, the controller 53 (visual effects function unit 60) performs visual effect lighting using all the plurality of light guide plates 8 in the decorative illumination devices 1R, 1L (S1). While performing visual effect lighting, the controller 53 (notification function unit 61) will continuously determine whether not information that should be conveyed was produced (S2), and whether the timing is one where information should be conveyed (S3). When the controller 53 (notification function unit 61) determines 'YES' at S2 or S3, processing advances to S4, and if the controller 53 determined 'NO' at S2 and S3, processing returns to S1, and S1 through S3 are repeated.

As an example, when the cheat detection unit 58 detects impropriety, the controller 53 determines 'YES' at S2 and processing advances to S4. When the cheat detection unit 58 does not detect impropriety, processing advances to S3, and the controller 53 determines whether the timing is one where predetermined information should be conveyed.

As an example, when a notification timing is established with regard to information on the previously mentioned credit amount, payout amount, or number of successes today and time of success, and the like, the controller 53 determines 'YES' at S3 when it is the established time, and processing advances to S4. If it is not the established time, processing returns to 51.

At S4, the controller 53 (notification function unit 61) causes the light guide plates 8 to emit light in accordance with the information to be conveyed in order to convey information. As an example, when the controller 53 determines 'YES' at S2 and processing advances to S4, if the notice is of cheating, the notification function unit 61 causes the top three light guide plates 8 in the decorative illumination devices 1R, 1L to light yellow, red, yellow from the top. Excluding the light guide plates 8 used for conveying information, the controller 53 (visual effects function unit 60) uses the remaining light guide plates 8 to (continue to) perform visual effect lighting. Further, when the controller 53 determines 'YES' at S3 and processing advances to S4, if the notice is for the previously mentioned credit amount and payout amount, the notification function unit 61 causes the number of light guide plates 8 from the bottom of the decorative illumination devices 1R, 1L to light in accordance with the monetary amount. Excluding the light guide plates 8 used for conveying information, the controller 53 (visual effects function unit 60) uses the remaining light guide plates 8 to (continue to) perform visual effect lighting.

Thereafter, processing advances to S5, and the controller 53 (notification function unit 61) terminates the processing for the conveying of information and returns to 51 on determining there is an instruction for terminating the conveying of information. The controller 53 (notification function unit 61 and visual effects function unit 60) executes S4 until the determination of 'YES' at S5. The controller 53 (notification function unit 61) may determine that there was an instruction for terminating the conveying of information by the passing of a predetermined amount of time from the start of the conveying information. Further, when there is a notice of cheating, the controller 53 may determine there was an instruction for terminating the conveying of information when an employee or a manger performs a predetermined operation to cancel the notice of cheating.

12. Effects of the Notification Function in the Decorative Illumination Device 1

Thus, the above configuration not only uses a plurality of light guide plates 8 to provide the above-described impactful visual effect, but also uses the respective light emissions of the plurality of light guide plates 8 to convey information making use of the fact that in the above described configuration the light emissions can be seen from at least two directions along the front and sides. Hereby, the decorative illumination device 1 (1R, 1L) is provided with two functions, i.e., a visual effects function and a notification function, which allow for providing a highly impactful visual effect and conveying more information while minimizing increases in cost.

The decorative illumination device 1 (1R, 1L) can convey various information; therefore, which facilitates management of the status and the like of the game machine 100 by a manager, and compared with installing a separate apparatus like a tower light, or the like, even more information can be conveyed while minimizing cost. Information for the player can also be conveyed using the illuminated light guide plates 8 facing the player; therefore, the player can instinctively grasp the notification information from the number of light guide plates 8 illuminated and the like.

Second Embodiment

An embodiment herein is described below on the basis of FIG. 18 and FIG. 19. For the sake of convenience, components previously described in a first embodiment that have an identical function are given the same reference numerals, and explanations therefor are omitted.

Figure 18:
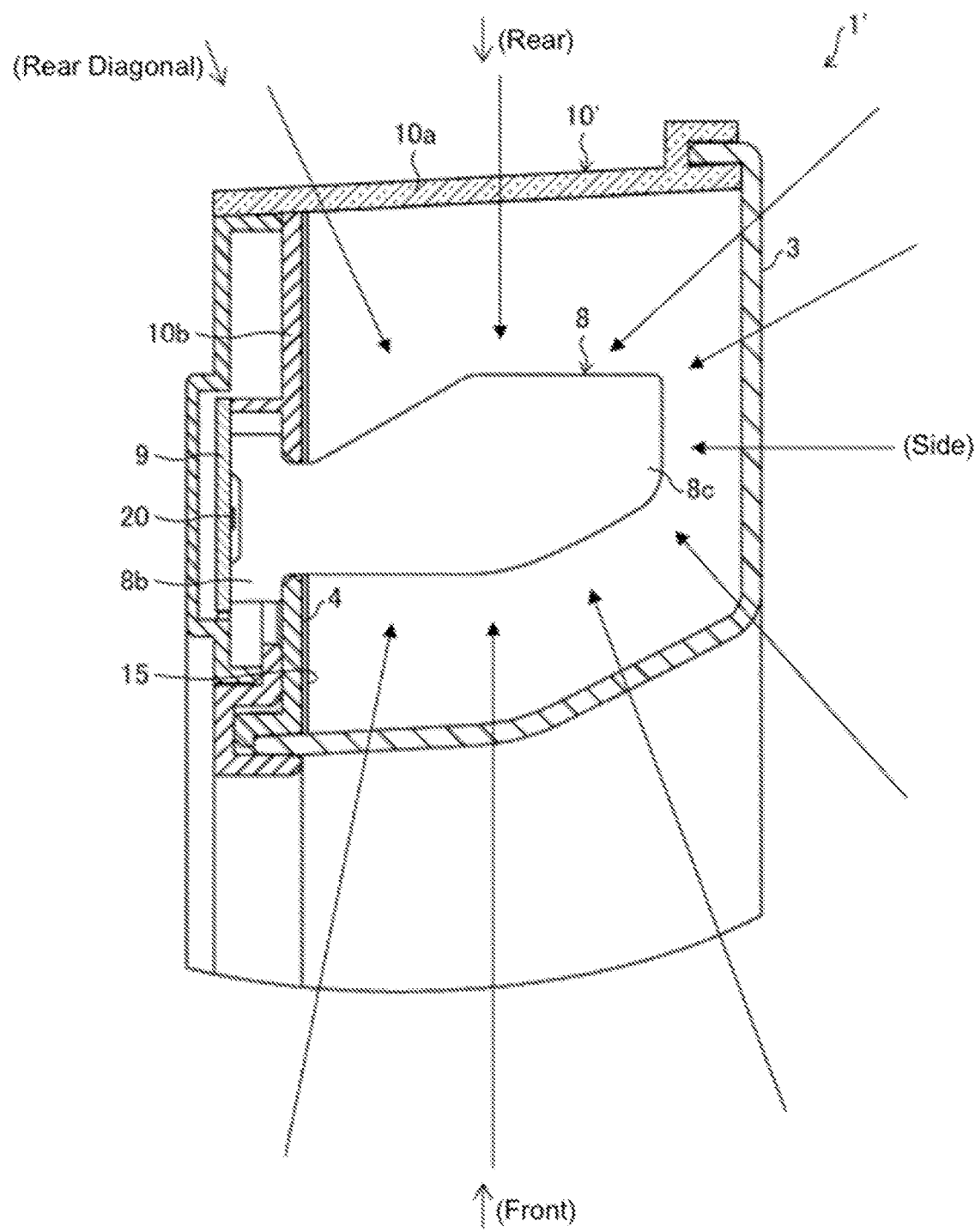
FIG. 18 is a diagram illustrating a cross-sectional view of a second embodiment of a decorative illumination device showing a section parallel to the light emitting surface of a light guide plate.

FIG. 18 is a cross-sectional diagram illustrating the present embodiment, of a decorative illumination device 1' cut parallel to the light emitting surface 8c of a light guide plate 8. The difference between the decorative illumination device 1' of the present embodiment, and the decorative illumination device 1 of a first embodiment is the case 10'. As illustrated in FIG. 18, the rear wall 10a of the case 10' in the decorative illumination device 1' is made of a transparent material similar to the cover part 3. In the above described embodiment, the rear wall 10a is constituted by a half-mirror similar to the cover part 3. The mirror unit 15 is provided on the inner wall constituted by the left-side wall 10b of the case 10' and the inner cover 4. The decorative illumination device 1' may be attached to the front left and right edge sections of an enclosure 101 for a game machine 100 while protruding laterally.

Figure 19:
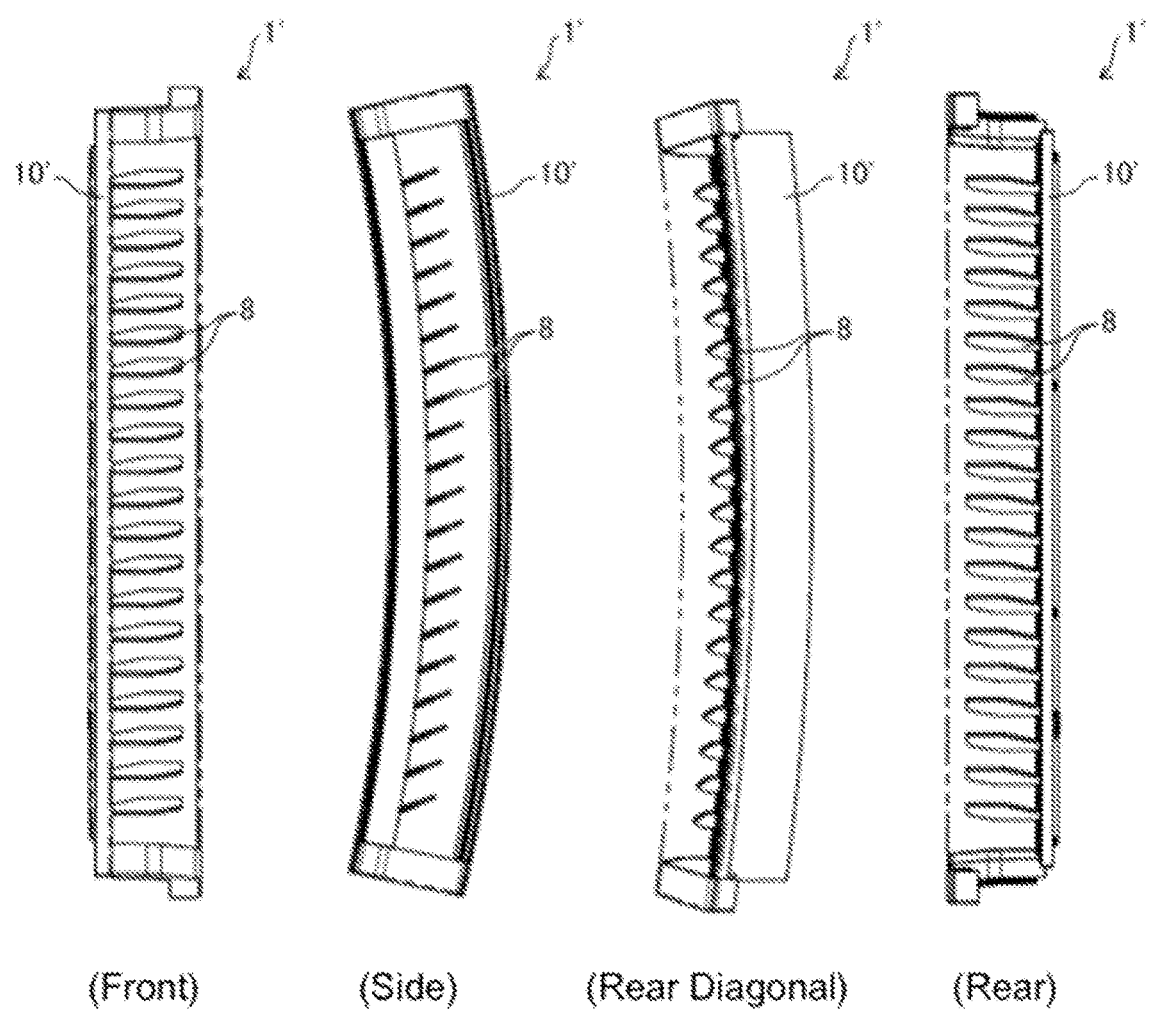
FIG. 19 is a diagram illustrating a decorative illumination device, for explaining how a decorative illumination device appears from a front, rear, side, and rear diagonal directions for a decorative illumination device, such as is illustrated in FIG. 18.

FIG. 19 is for describing how the decorative illumination device 1' appears from the front, rear, side, and rear diagonal directions. As illustrated in FIG. 19, the plurality of light guide plates 8 are visible from each of the front, rear, side (right side), and rear diagonal directions in the decorative illumination device 1'.

Thus, the light guide plates 8 inside the device can be seen from the front, rear, side (right side), and rear diagonal directions whereby a highly impactful visual effect can be presented for even a user located behind the game machine.

The above described configuration in particular not only provides an impactful visual effect, but also provides a visual effect that is visible to an employee situated behind the game machine. Therefore, the above described configuration, in combination with a configuration for conveying information, exhibits a particularly impactful result.

3. Modification Examples

While one or more embodiments are described above in detail, all points in the previous description are merely examples. It goes without saying that various modifications and variations are possible without departing from the scope of the invention. For instance, the following modifications are possible. Note that constituent elements that are identical to the constituent elements in the above described embodiment are given the same reference numerals and where appropriate, a description of features that are identical to the above embodiment are omitted. The following modifications may be combined as appropriate.

The above embodiments provide an example of some information that may be conveyed; however, a manager may set up the information to be conveyed, and the light emission pattern per hall in which the game machine 100 is installed. In the above embodiments, the drawing for a game and emission control for the decorative illumination devices 1R, 1L are performed by a single controller 53; however, a controller for performing only the drawing, and a controller for emission control for the decorative illumination devices 1R, 1L may be provided separately.

The above embodiments provide an example of a decorative illumination device that is long in the vertical direction as a long decorative illumination device that can be assembled onto the enclosure of a game machine; however, the decorative illumination device may be long in the horizontal direction, and the plurality of light guide plates 8 may be arranged along the horizontal direction.

Additionally, in one or more embodiments the external shape of all the plurality of light guide plates is the same; however, light guide plates 8 with different external shapes may be mixed in. Light guide plates 8 where the shape of the area the recesses 18 are formed may also be mixed in, where the recesses 18 determine the form of the illumination plane; additionally, the inclination angle or gap between the light guide plates 8 does not need to be uniform. A mirror unit 15 may be provided on both the rear wall 10a and the left-side wall 10b; moreover, a mirror unit 15 may also be provided on the upper wall 10c and the lower wall 10d. If the rear wall 10a is made up of the same transparent material as the cover part 3, the cross-section of the cover part 3 may be made U-shape, the case may be formed as a long, narrow panel and the cover part and case fitted together.

Example Software Implementation

The control blocks in the controller 53 (in particular, the visual effects function unit 60 and the notification function unit 61) may be implemented as logic circuits (hardware) formed on an integrated circuit (IC chip) or the like, or may be implemented as software.

In the latter case, the controller 53 is provided with a computer for executing the commands in a program which is the software that implements the functions. The computer may be equipped with, for instance, one or more processors, and with a computer-readable recording medium for storing the above program. The processor reads the program from the recording medium and executes the same on the computer to achieve various aims in accordance with embodiments as described herein. A central processing unit (CPU) may serve as the processor. A "permanent physical medium", e.g., besides Read Only Memory (ROM), tape, disc, card, semiconductor memory, programmable logic circuit, or the like may be used for the recording medium. A Random Access Memory (RAM) into which the program is extracted, may also be provided. The program may by supplied to the computer via any transmission medium (a communication network, or broadcast waves, or the like) capable of transmitting the program. Finally, one or more aspects may be implemented in the form of data signals encapsulated in carrier waves that are realized through the electronic transmission of the program.

The scope of the invention however is not limited to the above-described embodiments, and various modifications can be made within the scope of the claims, and one or more embodiments obtained by appropriately combining the technical means disclosed in the different embodiments are also included in the technical scope of the invention.

The invention claimed is:

1. A decorative illumination device that is elongated and configured for installation in an enclosure of a game machine, the decorative illumination device comprising:
a plurality of light guide plates configured to reflect light entering from an end surface thereof with reflection surfaces formed in recesses, and causing the light to be emitted from a light emitting surface;
a plurality of light sources corresponding to the plurality of light guide plates;
a long window part open from at least two directions of a front surface of the decorative illumination device and side surfaces connected to the front surface; and
a controller; wherein
the plurality of light guide plates is slanted with gaps therebetween, so that in a slanted state the light emitting surfaces are oriented toward the window part; and
the controller performs operations comprising:
operation as a visual effects function unit configured to control light emission of the plurality of light guide plates by controlling the driving of the plurality of light sources to control light emission from the plurality of light guide plates to perform visual effect lighting; and
operation as a notification function unit configured to control light emission from the plurality of light guide plates to convey predetermined information.

2. A control device for a decorative illumination device that is elongated and configured for installation in an enclosure of a game machine, wherein
the decorative illumination device comprises:
a plurality of light guide plates configured to reflect light entering therein from an end surface thereof with reflection surfaces formed in recesses thereon, and causing the light to be emitted from a light emitting surface thereof;
a plurality of light sources provided corresponding to the plurality of light guide plates; and
a long window part open from at least two directions of a front surface of the decorative illumination device and side surfaces connected to the front surface,
the plurality of light guide plates is slanted with gaps therebetween, so that in the slanted state the light emitting surfaces thereof are oriented toward the window part, and
the control device performs operations comprising:
operation as a visual effects function unit configured to control light emission of the plurality of light guide plates by controlling the driving of the plurality of light sources and control light emission from the plurality of light guide plates to perform visual effect lighting; and
operation as a notification function unit configured to control light emission from the plurality of light guide plates to convey predetermined information.

3. The control device for the decorative illumination device according to claim 2, wherein
the decorative illumination device is elongated and long in a vertical direction; and
the plurality of light guide plates is arranged in the vertical direction, in a slanted state where a rear part thereof is higher than the front part thereof so that the light emitting surfaces are oriented toward the window part.

4. The control device for the decorative illumination device according to claim 3, wherein operation as the notification function unit comprises controlling the light emission of a predetermined plurality of light guide plates located at the top part of the decorative illumination device to convey predetermined information.

5. The control device for the decorative illumination device according to claim 4, wherein
the predetermined information comprises information indicating an operation state of the game machine, information indicating the open or closed state of a door to the game machine, information indicating the game machine is experiencing an error, or information for conveying that there is cheating with respect to the game machine.

6. The control device for the decorative illumination device according to claim 2, wherein
operation as the notification function unit comprises conveying information related to a numerical value with the number of the light guide plates caused to emit light.

7. The control device for the decorative illumination device according to claim 3, wherein
a pair of the decorative illumination devices is installed with one on each side of the front of the enclosure of the game machine; and
operation as the notification function unit comprises conveying information related to numerical values that are mutually related with the number of light guide plates in the respective decorative illumination devices on the left and right caused to emit light.

8. The control device for the decorative illumination device according to claim 7, wherein
the information related to numerical values that are mutually related comprises information indicating an amount credited in the game machine and an amount paid out from the game machine, information indicating the number of jackpots and small prizes, or information indicating the number of successes and the time of success.

9. The control device for the decorative illumination device according to claim 2, wherein
in response to operation as the notification function unit conveying information among the plurality of light guide plates, operation as the visual effects function unit comprises using the light guide plates that are not being used by the notification function unit to convey information to perform the visual effect lighting.

10. The control device for the decorative illumination device according to claim 3, wherein
in response to operation as the notification function unit conveying information among the plurality of light guide plates, operation as the visual effects function unit comprises using the light guide plates that are not being used by the notification function unit to convey information to perform the visual effect lighting.

11. The control device for the decorative illumination device according to claim 4, wherein
in response to operation as the notification function unit conveying information among the plurality of light guide plates, operation as the visual effects function unit comprises using the light guide plates that are not being used by the notification function unit to convey information to perform the visual effect lighting.

12. The control device for the decorative illumination device according to claim 5 wherein
in response to operation as the notification function unit conveying information among the plurality of light guide plates, operation as the visual effects function unit comprises using the light guide plates that are not being used by the notification function unit to convey information to perform the visual effect lighting.

13. The control device for the decorative illumination device according to claim 6, wherein
in response to operation as the notification function unit conveying information among the plurality of light guide plates, operation as the visual effects function unit comprises using the light guide plates that are not being used by the notification function unit to convey information to perform the visual effect lighting.

14. The control device for the decorative illumination device according to claim 7, wherein
in response to operation as the notification function unit conveying information among the plurality of light guide plates, operation as the visual effects function unit comprises using the light guide plates that are not being used by the notification function unit to convey information to perform the visual effect lighting.

15. The control device for the decorative illumination device according to claim 8, wherein
in response to operation as the notification function unit conveying information among the plurality of light guide plates, operation as the visual effects function unit comprises using the light guide plates that are not being used by the notification function unit to convey information to perform the visual effect lighting.

16. The control device for the decorative illumination device according to claim 2, wherein
operation as the notification function unit comprises interrupting the visual effect lighting from operation as the visual effects function unit to convey predetermined information.

17. The control device for the decorative illumination device according to claim 3, wherein
operation as the notification function unit comprises interrupting the visual effect lighting from operation as the visual effects function unit to convey predetermined information.

18. The control device for the decorative illumination device according to claim 4, wherein
operation as the notification function unit comprises interrupting the visual effect lighting from operation as the visual effects function unit to convey predetermined information.

19. A non-transitory computer-readable storage medium storing a control program for causing a computer to function as a control device for a decorative illumination device, the program, which when read and executed, causes a computer to perform operations of the visual effects function unit and the notification function according to claim 2.

20. A game machine comprising:
a main game unit; and
a decorative illumination device according to claim 1 installed on the enclosure of the main game unit.

* * * * *